US012518676B2

(12) United States Patent
Knausz et al.

(10) Patent No.: US 12,518,676 B2
(45) Date of Patent: Jan. 6, 2026

(54) MEMORY ARCHITECTURES FOR HYBRID CLUSTER DISPLAYS

(71) Applicant: X Display Company Technology Limited, Dublin (IE)

(72) Inventors: Imre Knausz, Fairport, NY (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 18/436,388

(22) Filed: Feb. 8, 2024

(65) Prior Publication Data

US 2024/0274064 A1 Aug. 15, 2024

Related U.S. Application Data

(60) Provisional application No. 63/445,889, filed on Feb. 15, 2023.

(51) Int. Cl.
*G09G 3/32* (2016.01)

(52) U.S. Cl.
CPC ........... *G09G 3/32* (2013.01); *G09G 2300/06* (2013.01); *G09G 2320/0247* (2013.01); *G09G 2320/0266* (2013.01); *G09G 2320/064* (2013.01); *G09G 2330/021* (2013.01)

(58) Field of Classification Search
CPC ................. G09G 3/32; G09G 2300/06; G09G 2320/0247; G09G 2320/0266; G09G 2320/064; G09G 2330/021
See application file for complete search history.

(56) References Cited

U.S. PATENT DOCUMENTS

| | | | | |
|---|---|---|---|---|
| 5,550,066 | A * | 8/1996 | Tang | H10K 59/121 257/E29.293 |
| 6,646,623 | B1 * | 11/2003 | Chakrabarti | G09G 3/002 348/E13.056 |
| 7,622,367 | B1 | 11/2009 | Nuzzo et al. | |
| 8,207,954 | B2 * | 6/2012 | Cok | G09G 3/20 345/206 |
| 8,506,867 | B2 | 8/2013 | Menard | |
| 8,722,458 | B2 | 5/2014 | Rogers et al. | |
| 9,153,171 | B2 * | 10/2015 | Sakariya | H01L 25/0753 |
| 9,520,537 | B2 | 12/2016 | Bower et al. | |
| 10,395,589 | B1 * | 8/2019 | Vahid Far | G09G 3/3208 |
| 10,395,590 | B1 * | 8/2019 | Lin | G09G 3/3275 |
| 10,692,844 | B2 * | 6/2020 | Cok | H01L 33/0095 |
| 10,714,001 | B2 * | 7/2020 | Cok | H01L 27/156 |
| 10,832,609 | B2 * | 11/2020 | Rotzoll | G09G 3/2007 |

(Continued)

*Primary Examiner* — Benyam Ketema

(74) *Attorney, Agent, or Firm* — Choate, Hall & Stewart LLP; Michael D. Schmitt

(57) ABSTRACT

A hybrid display includes pixel clusters and a display controller operable to provide pixel values to the cluster controllers. Each pixel cluster incudes (i) pixels; (ii) a pixel memory for storing fewer than two pixel values for each of the pixels; and (iii) a cluster controller operable to (a) control the pixels to emit light corresponding to the pixel values, (b) receive pixel values, and (c) store the pixel values in the pixel memory. The pixel values are digital values and each of the cluster controllers is operable to receive pixel values from the display controller and store the pixel values in the pixel memory at the same time that the cluster controller controls the pixels to emit light corresponding to the pixel values.

19 Claims, 20 Drawing Sheets

(56) References Cited

U.S. PATENT DOCUMENTS

| | | | | |
|---|---|---|---|---|
| 10,833,225 | B2 * | 11/2020 | Bower | H01L 33/60 |
| 10,910,355 | B2 * | 2/2021 | Cok | H01L 25/0753 |
| 11,127,812 | B2 * | 9/2021 | Bower | H10K 59/179 |
| 11,386,826 | B1 * | 7/2022 | Cok | G09G 3/3208 |
| 11,568,796 | B1 * | 1/2023 | Ozbas | G09G 3/3426 |
| 11,568,803 | B1 * | 1/2023 | Cok | G09G 3/2092 |
| 11,592,933 | B1 * | 2/2023 | Ozbas | H10K 59/40 |
| 2010/0123694 | A1 * | 5/2010 | Cok | G09G 3/2085 345/206 |
| 2012/0176393 | A1 * | 7/2012 | Ohkawa | G09G 3/3648 365/51 |
| 2016/0093600 | A1 | 3/2016 | Bower et al. | |
| 2018/0197471 | A1 * | 7/2018 | Rotzoll | G09G 3/2003 |
| 2019/0206330 | A1 * | 7/2019 | Kim | G09G 3/3233 |
| 2019/0347985 | A1 * | 11/2019 | Shaeffer | G09G 3/32 |
| 2020/0020676 | A1 * | 1/2020 | Cok | H10K 59/90 |
| 2020/0135093 | A1 * | 4/2020 | Prathaban | G09G 3/32 |
| 2021/0383763 | A1 * | 12/2021 | Kim | H10K 59/131 |
| 2022/0020315 | A1 * | 1/2022 | Cok | H03K 3/017 |
| 2022/0122519 | A1 * | 4/2022 | Bower | H01L 25/167 |
| 2022/0392388 | A1 * | 12/2022 | Meitl | G09G 3/2003 |
| 2023/0055746 | A1 * | 2/2023 | Ozbas | G09G 3/3426 |
| 2023/0316996 | A1 * | 10/2023 | Ozbas | G09G 3/3208 345/214 |
| 2023/0351945 | A1 * | 11/2023 | Cok | G09G 3/2092 |
| 2024/0071279 | A1 * | 2/2024 | Knausz | G09G 3/2081 |
| 2024/0185767 | A1 * | 6/2024 | Bower | G09G 3/3426 |

* cited by examiner

MEMORY ARCHITECTURES FOR HYBRID CLUSTER DISPLAYS

CROSS REFERENCE TO RELATED APPLICATIONS

This application claims priority to U.S. Provisional Application No. 63/445,889, filed Feb. 15, 2023. Reference is made to U.S. patent application Ser. No. 17/730,593 filed Apr. 22, 2022, entitled Multi-Row Buffering for Active-Matrix Cluster Displays by Cok. The disclosures of each of the above-referenced applications are incorporated by reference herein in their entireties.

TECHNICAL FIELD

The present disclosure relates to display memory architectures having active-matrix cluster controllers for groups of pixels. The pixels in each group are controlled using passive-matrix control.

BACKGROUND OF THE DISCLOSURE

Flat-panel displays are widely used in conjunction with computing devices, in portable electronic devices, and for entertainment devices such as televisions. Such displays typically employ an array of pixels distributed over and on a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing only electronic control circuitry external to the pixel array or an active-matrix (AM) control scheme employing electronic control circuitry in the pixels on the display substrate and associated with each light-emitting element. Both OLED displays and LCDs using passive-matrix control and active-matrix control are available. An example of such an AM OLED display device is disclosed in U.S. Pat. No. 5,550,066.

In a PM-controlled display, each pixel in a row is stimulated to emit light at the same time while the pixels in the other rows do not emit light and each row is sequentially activated at a high rate to provide the visual illusion that all of the rows or pixels simultaneously emit light. Because of the high rate (refresh) requirement, PM displays are typically limited in size (area) and in the number of pixel rows. In contrast, in an AM-controlled display, data is concurrently provided to and stored in pixels in a row and the rows are sequentially selected to load the data in the selected row. Each pixel emits light corresponding to the stored data when pixels in other rows receive data so that all of the rows of pixels in the display emit light at the same time, except possibly the row loading pixels. In such AM systems, the row activation rate can be much slower than in PM systems, for example divided by the number of rows. Control of the light-emitting elements is usually provided through a data signal line (display column wire), a select signal line (display row wire), a power connection, and a ground connection. AM displays are often much larger in area and number of pixels than PM displays.

In a conventional AM display, each display sub-pixel (e.g., light emitter) is controlled by one control element, and each control element includes at least one transistor. For example, in a simple active-matrix organic light-emitting diode (OLED) analog display, each control element includes two transistors (a select transistor and a power driving transistor) and one capacitor for storing a charge specifying the luminance of the light emitter. Each OLED element employs an independent control electrode connected to the power transistor and a common electrode. In contrast, an LCD typically uses a single transistor to control each pixel. Such circuits can be expensive and require significant area on a display substrate, especially for thin-film circuits on the substrate of a flat-panel display.

U.S. Pat. No. 8,207,954 filed Nov. 17, 2008, entitled Display Device with Chiplets and Hybrid Drive by Cok et al. describes a display device comprising a two-dimensional array of pixels associated into a plurality of pixel groups. A separate set of group row electrodes and group column electrodes are connected to pixels in each pixel group and are controlled by two or more chiplets within the pixel array. The chiplets have storage elements storing a value representing a desired luminance for each pixel.

There remains a need for display systems that provide improved efficiency and performance with reduced costs.

SUMMARY

The present disclosure includes, among various embodiments, an active-matrix display with passive-matrix pixel clusters comprising pixel clusters and a display controller.

According to embodiments of the present disclosure, a hybrid display comprises pixel clusters and a display controller. Each of the pixel clusters comprises (i) pixels, (ii) a pixel memory for storing fewer than two pixel values for each of the pixels, and (iii) a cluster controller. Each cluster controller can be operable to (a) control each of the pixels in the pixel cluster to emit light corresponding to the fewer than two pixel values for each of the pixels, (b) receive the fewer than two pixel values for each of the pixels in the pixel cluster, and (c) store the fewer than two pixel values in the pixel memory for each of the pixels in the pixel cluster. The display controller can be operable to provide the fewer than two pixel values for each of the pixels in each pixel cluster to each of the cluster controllers. In embodiments, the fewer than two pixel values for each of the pixels in each pixel cluster are digital values (e.g., digital pixel values). Each of the cluster controllers can be operable to receive the fewer than two pixel values for each of the pixels in the pixel cluster from the display controller and store the received fewer than two pixel values for each of the pixels in the pixel memory at the same time that each of the cluster controllers controls the pixels in the pixel cluster to emit light corresponding to the fewer than two pixel values for each of the pixels in the pixel cluster.

In some embodiments, a hybrid display comprises pixel clusters and a display controller. Each of the pixel clusters comprises (i) pixels, (ii) a pixel memory for storing pixel values for each of the pixels, and (iii) a cluster controller operable to (a) control the pixels to emit light corresponding to the pixel values, (b) receive the pixel values, and (c) store the pixel values in the pixel memory. The display controller can be operable to provide the pixel values to the cluster controller for each of the pixel clusters. In embodiments, for each of the pixel clusters the cluster controller is operable to store one or more of the pixel values in the pixel memory at a same time that the cluster controller controls the pixels to emit light using one or more of the pixel values. In embodiments, the pixel values are digital pixel values. In some embodiments, each of the cluster controllers is operable to receive the pixel values from the display controller and store the received pixel values in the pixel memory at the same time that the cluster controller controls the pixels to emit light corresponding to the pixel values.

According to embodiments of the present disclosure, for each of the pixel clusters the pixels in the pixel cluster are controlled by the cluster controller with passive-matrix control. In some embodiments, for each of the pixel clusters, the cluster controller controls the pixels to emit light using pulse-width modulation control. In some embodiments, an amount of time to write a pixel value into the pixel memory is no greater than an amount of time of a shortest pulse of the pulse-width modulation control. In some embodiments, an amount of time to write a pixel value into the pixel memory is equal to or greater than an amount of time of a shortest pulse of the pulse-width modulation control.

According to embodiments of the present disclosure, for each of the pixel clusters, each of the pixels comprises C light emitters, each of the pixel values comprises C luminance values, each corresponding to one of the C light emitters, each of the luminance values has D bits, the pixels are disposed in an array of M rows and N columns, M is no less than two, N is no less than one, and C is no less than one, and the pixel memory has (i) a storage for pixel values of at least $M \times N \times C \times D$ bits (e.g., the pixel memory has a storage size of at least $M \times N \times C \times D$ bits) and (ii) at least M row addresses. For example, the M row addresses can have a range from 0 to $(M-1)$.

In some embodiments, the pixel memory can have $M \times D$ row addresses and each row address can access $C \times N$ bits, where each bit corresponds to a bit of a luminance value. In some embodiments, the pixel memory has M row addresses and each row address accesses N pixel values equivalent to $C \times N$ luminance values and $C \times N \times D$ bits.

According to some embodiments, the cluster controller is operable to read output pixel data stored at row address $I_{OUTPUT}$ of the pixel memory and control each of the pixels corresponding to row address $I_{OUTPUT}$ to emit light corresponding to the output pixel data at a same time that the cluster controller stores input pixel data at row address $I_{INPUT}$ of the pixel memory. In some embodiments, $I_{OUTPUT}$ equals $I_{INPUT}$ (e.g., $I_{OUTPUT}=I_{INPUT}$). In some embodiments, $I_{OUTPUT}$ does not equal $I_{INPUT}$ (e.g., $I_{OUTPUT} \neq I_{INPUT}$). In some embodiments, the pixel memory has M row addresses and $(I_{OUTPUT}<M)$ and $(I_{INPUT}<M)$.

According to embodiments of the present disclosure, the pixel memory storage is no greater than a storage of $N \times (M+1)$ pixel values. In some embodiments, storage of the pixel memory (e.g., pixel memory storage) is no greater than a storage of $N \times M$ pixel values plus $N \times C$ bits.

In some embodiments, the cluster controller is operable to read output pixel data stored at row address $I_{OUTPUT}$ of the pixel memory and control each of the pixels corresponding to row address $I_{OUTPUT}$ to emit light corresponding to the output pixel data at a same time that the cluster controller stores input pixel data in one or more row addresses $I_{INPUT}$ of the pixel memory where $(I_{INPUT} \neq I_{OUTPUT})$. In some embodiments, the pixel memory has M row addresses, $I_{OUTPUT}<M$, and $I_{INPUT}<M$. The one or more row addresses $I_{INPUT}$ can be two or more row addresses. In some embodiments, the pixel memory has M row addresses and the one or more row addresses $I_{INPUT}$ are $(M-1)$ row addresses.

In some embodiments, the cluster controller is operable to read output pixel data stored at row address $I_{OUTPUT}$ of the pixel memory and copy the pixel data into the pixel memory at row address $I_{OUTPUT2}$, where $I_{OUTPUT} \neq I_{OUTPUT2}$. In some embodiments, the cluster controller is operable to copy the pixel data bit wise. In some embodiments, the cluster controller is operable to copy the pixel data pixel value wise.

In some embodiments of the present disclosure, the pixel memory storage is $(M+1) \times N \times C \times D$ bits in size and the pixel memory has row addresses having a range at least from zero to M. The cluster controller can be operable to read output pixel data stored at row address $I_{OUTPUT}$ of the pixel memory $(I_{OUTPUT}<(M+1))$ and control the pixels corresponding to row address $I_{OUTPUT}$ to emit light corresponding to the output pixel data at a same time that the cluster controller stores input pixel data at one or more row addresses $I_{INPUT}$ of the pixel memory, where $(I_{INPUT} \neq I_{OUTPUT})$ and $(I_{INPUT}<(M+1))$.

In embodiments of the present disclosure, for each of the pixel clusters, the cluster controller is operable to receive rows of pixel values at an input rate and output rows of pixel values to display information at an output rate and the input rate is greater than the output rate. In some embodiments, for each of the pixel clusters, the cluster controller is operable to receive rows of pixel values at an input rate and output rows of pixel values to display information at an output rate and the input rate is less than or equal to the output rate. In some embodiments, for each of the pixel clusters, the cluster controller is operable to sequentially output single bits of each pixel value in a row of pixel values from the pixel memory and control the pixels to emit light corresponding to the single bits.

According to embodiments of the present disclosure, for each of the pixel clusters, the cluster controller is operable to write a pixel value into the pixel memory between output of single bits in a pixel value. In some embodiments, for each of the pixel clusters, the cluster controller is operable to write a pixel value into the pixel memory during output of single bits in a pixel value. In some embodiments, the cluster controller is operable to input a pixel value into the pixel memory in a blanking interval after controlling the pixels to emit light corresponding to a bit of a luminance value or in a blanking interval after controlling the pixels to emit light corresponding to an entire pixel value.

According to some embodiments of the present disclosure, the cluster controller is operable to (i) receive an input address of one or more input pixel values, (ii) compare the input address to an output address of a row of one or more output pixel values that are used to control the pixels to emit light and, and (iii) write the one or more input pixel values into the pixel memory only if the input address does not match the output address.

According to embodiments of the present disclosure, the cluster controller is operable to receive pixel values in a burst at regular or irregular intervals. According to embodiments of the present disclosure, for each of the pixel clusters, the cluster controller is operable to control the pixels independently of any other of the pixel clusters. In some embodiments, the pixel clusters are operable to emit light from all of the pixels in a common row at a same time. In some embodiments, each of the pixels comprises one or more light emitters that are inorganic micro-light-emitting diodes.

According to some embodiments of the present disclosure, an asynchronous memory bit cell comprises a first inverter with a first input and a first output, a second inverter with a second input and a second output, the first output connected to the second input, a write switch controllable by a write signal WC and connected between a data input and the first input, and a write-select switch controllable by an inverted WC signal and connected between the second output and the first input. Some embodiments comprise a read switch controllable by a read signal RC and connected between the first output and a data output.

In some embodiments, an asynchronous memory comprises (i) an array of memory bit cells, wherein the data input signals for the memory bit cells are connected together and the data output signals for the memory bit cells are connected together, (ii) a write-selection circuit operable to provide the write signal WC for each of the memory bit cells, and (iii) a read-selection circuit, independent of and comprising a separate circuit from the write-selection circuit, operable to provide the read signal RC for each of the memory bit cells.

In some embodiments of the present disclosure, an asynchronous memory comprises a first inverter with a first input and a first output, a second inverter with a second input and a second output, the first output connected to the second input, a write switch controllable by a write signal WC and connected between a data input and the first input, and a read switch controllable by a read signal and connected between the second output and the first input.

In some embodiments of the present disclosure, an asynchronous memory comprises an array of memory bit cells, wherein the data input (e.g., data input signals) for the memory bit cells are connected together and the data outputs for the memory bit cells are connected together, and a read-selection circuit, independent of and comprising a separate circuit from the write-selection circuit, that is operable to provide the read signal RC for each of the memory bit cells.

According to some embodiments of the present disclosure, a hybrid display comprises pixel clusters and a display controller. Each of the pixel clusters comprises (i) pixels, (ii) a pixel memory for storing fewer than two digital pixel values for each of the pixels, and (iii) a cluster controller operable to (a) control the pixels using pulse-width modulation control to emit light corresponding to the fewer than two digital pixel values, (b) receive the fewer than two digital pixel values for each of the pixels in the pixel cluster, and (c) store the fewer than two digital pixel values for each of the pixels in the pixel cluster in the pixel memory. The display controller can be operable to provide the fewer than two pixel values for each of the pixels in each pixel cluster to the cluster controller for each of the pixel clusters. In some embodiments, for each of the pixel clusters, (i) the cluster controller is operable to receive the fewer than two digital pixel values for each of the pixels in the pixel cluster from the display controller and store the fewer than two digital pixel values for each of the pixels in the pixel cluster in the pixel memory at a same time that the cluster controller controls the pixels to emit light corresponding to the fewer than two digital pixel values for each of the pixels in the pixel cluster, (ii) each of the fewer than two digital pixel values for each of the pixels in the pixel cluster comprises one or more digital luminance values, each of the one or more digital luminance values comprising multiple bits, and (iii) the pixel memory is accessed with row addresses and each unique one of the row addresses accesses a single bit of each of multiple luminance values.

In some embodiments of the present disclosure, a hybrid display comprises pixel clusters and a display controller. Each of the pixel clusters can comprise (i) pixels, (ii) a pixel memory for storing pixel values for each of the pixels, and (iii) a cluster controller operable to (a) control the pixels using pulse-width modulation control to emit light corresponding to the pixel values, (b) receive the pixel values, and (c) store the pixel values in the pixel memory. The display controller can be operable to provide the pixel values to the cluster controller for each of the pixel clusters. In some embodiments, for each of the pixel clusters, (i) the cluster controller is operable to receive the pixel values from the display controller and store the pixel values in the pixel memory at a same time that the cluster controller controls the pixels to emit light corresponding to the pixel values, (ii) each of the pixel values comprises one or more digital luminance values, each of the one or more digital luminance values comprising multiple bits, and (iii) the pixel memory is accessed with row addresses and each unique one of the row addresses accesses a single bit of each of multiple luminance values. In embodiments, the pixel memory can store fewer than two pixel values for each of the pixels. In embodiments, the pixel values for each of the pixels can be digital pixel values.

According to embodiments of the present disclosure, a method of controlling a hybrid display comprising pixel clusters, each of the pixel clusters comprising (i) pixels, (ii) a pixel memory for storing digital pixel values for the pixels, and (iii) a cluster controller, comprises receiving one or more digital pixel values at the cluster controller, storing the one or more pixel values in the pixel memory, and emitting light from the pixels (e.g., one or more of the pixels) using one or more other digital pixel values while the one or more pixel values are being stored (e.g., the pixels emit light at the same time as or concurrently with storing the one or more pixel values). The one or more other pixel values can be read bit wise from different row addresses in the pixel memory by the cluster controller to cause the pixels to emit the light. The one or more other pixel values can be read pixel value wise from one or more row addresses in the pixel memory by the cluster controller to cause the pixels to emit the light.

In some embodiments, methods of the present disclosure comprise reading pixel data (e.g., one or more pixel values or one or more bits comprised in one or more pixel values) from a row address of the pixel memory and simultaneously writing pixel data to any row address of the pixel memory (e.g., the row address or any other row address). Methods can comprise, for at least one of the pixel clusters, reading output pixel data stored at row address $I_{OUTPUT}$ of the pixel memory with the cluster controller and controlling each of the pixels corresponding to row address $I_{OUTPUT}$ to emit light corresponding to the output pixel data while the cluster controller stores input pixel data at row address $I_{INPUT}$ of the pixel memory. $I_{OUTPUT}$ can equal $I_{INPUT}$. In some embodiments, $I_{OUTPUT}$ does not equal $I_{INPUT}$. The pixel memory can have M row addresses and $I_{OUTPUT}<M$ and $I_{INPUT}<M$.

Some methods of the present disclosure can comprise, for at least one of the pixel clusters, reading output pixel data stored at row address $I_{OUTPUT}$ of the pixel memory with the cluster controller and controlling each of the pixels corresponding to row address $I_{OUTPUT}$ to emit light corresponding to the output pixel data while the cluster controller stores input pixel data in one or more row addresses $I_{INPUT}$ of the pixel memory where $I_{INPUT} \neq I_{OUTPUT}$. The pixel memory can have M row addresses, $I_{OUTPUT}$ can be less than M, and $I_{INPUT}$ can be less than M.

In some embodiments, the one or more row addresses $I_{INPUT}$ are two or more row addresses. In some embodiments, the pixel memory has M row addresses and the one or more row addresses $I_{INPUT}$ are (M−1) row addresses.

Some methods of the present disclosure can comprise, for at least one of the pixel clusters, reading output pixel data stored at row address $I_{OUTPUT}$ of the pixel memory with the cluster controller and copying the pixel data into the pixel memory at row address $I_{OUTPUT2}$, where $I_{OUTPUT} \neq I_{OUTPUT2}$. The copying can occur bit wise. The copying can occur pixel value wise.

Some methods of the present disclosure can comprise, for at least one of the pixel clusters reading output pixel data stored at row address $I_{OUTPUT}$ of the pixel memory ($I_{OUTPUT}<(M+1)$) with the cluster controller and controlling the pixels corresponding to row address $I_{OUTPUT}$ to emit light corresponding to the output pixel data while the cluster controller stores input pixel data at one or more row addresses $I_{INPUT}$ of the pixel memory, where $I_{INPUT} \neq I_{OUTPUT}$ and $I_{INPUT}<(M+1)$.

Some methods of the present disclosure can comprise, for at least one of the pixel clusters receiving rows of pixel values at the cluster controller at an input rate and outputting rows of pixel values with the cluster controller at an output rate to control the pixels in the pixel cluster to emit light, wherein the input rate is greater than the output rate. Some methods of the present disclosure can comprise, for at least one of the pixel clusters receiving rows of pixel values at the cluster controller at an input rate and outputting rows of pixel values with the cluster controller at an output rate to control the pixels in the pixel cluster to emit light, wherein the input rate is less than or equal to the output rate.

Some methods of the present disclosure can comprise, for at least one of the pixel clusters sequentially outputting single bits of each pixel value in a row of pixel values from the pixel memory with the cluster controller and controlling the pixels to emit light corresponding to the single bits.

Some methods of the present disclosure can comprise, for at least one of the pixel clusters, writing a pixel value into the pixel memory between output of single bits in a pixel value. Some methods of the present disclosure can comprise, for at least one of the pixel clusters, writing a pixel value into the pixel memory during output of single bits in a pixel value.

Some methods of the present disclosure can comprise, for at least one of the pixel clusters, inputting a pixel value into the pixel memory in a blanking interval after controlling the pixels to emit light corresponding to a bit of a luminance value or in a blanking interval after controlling the pixels to emit light corresponding to an entire pixel value.

Some methods of the present disclosure can comprise, for at least one of the pixel clusters receiving an input address of one or more input pixel values at the cluster controller, comparing the input address to an output address of a row of one or more output pixel values that are used to control the pixels to emit light, and writing the one or more input pixel values into the pixel memory only if the input address does not match the output address.

Some methods of the present disclosure can comprise, for at least one of the pixel clusters receiving pixel values at the cluster controller in a burst at regular or irregular intervals and storing the pixel values in the pixel memory.

Embodiments of the present disclosure provide active and passive display control methods and architectures that enable improved control of displays with reduced power and improved bit depth.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
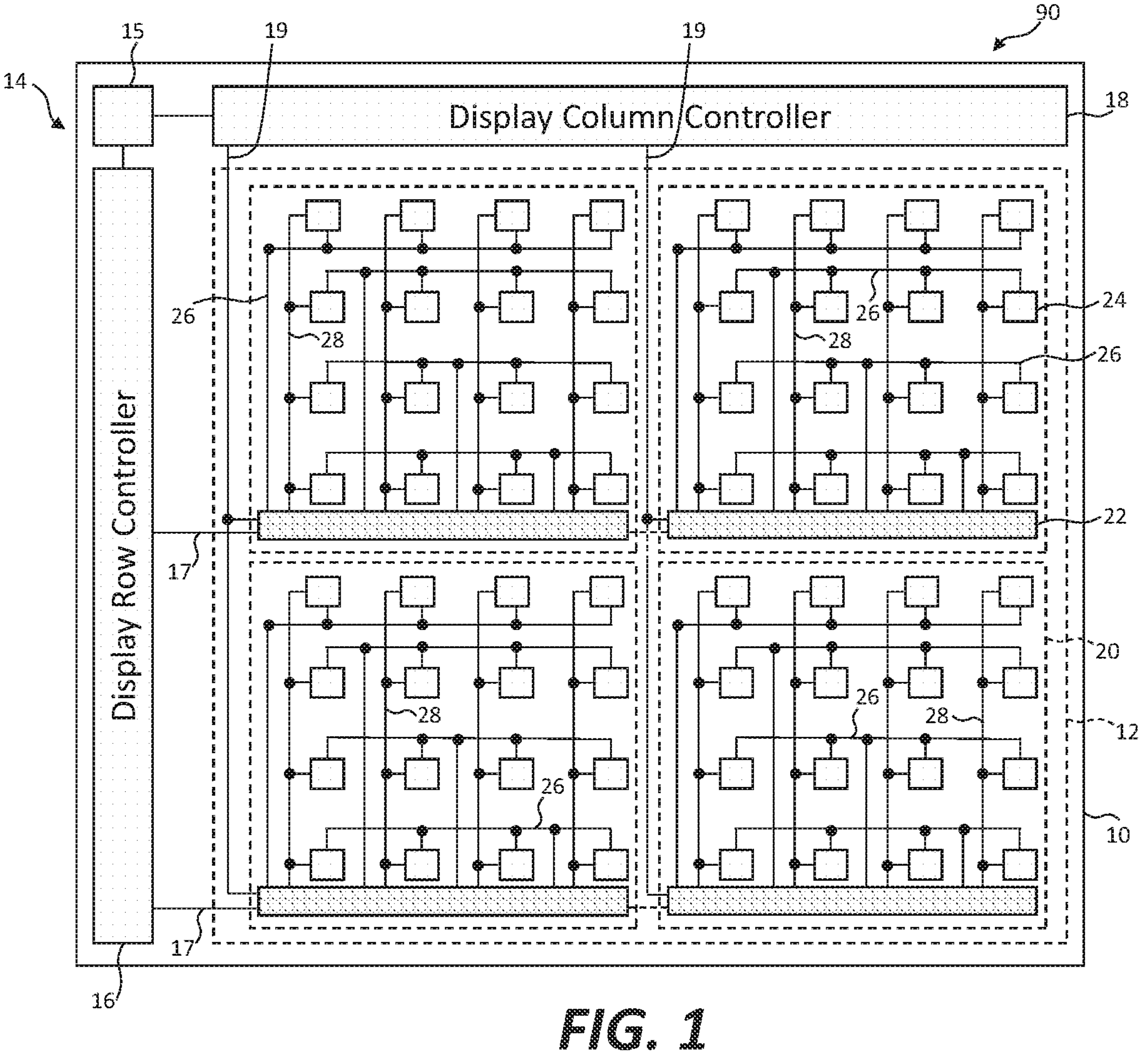
FIG. 1 is a schematic circuit diagram of a hybrid display comprising pixels arranged in mutually exclusive pixel clusters according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Embodiments of the present disclosure provide, inter alia, active- and passive-matrix display control methods and architectures that require fewer or smaller and less expensive control circuits with improved performance for flat-panel displays (e.g., large-substrate displays) with an array of pixels. The pixels can comprise one or more light emitters that are inorganic light-emitting diodes.

Figure 2:
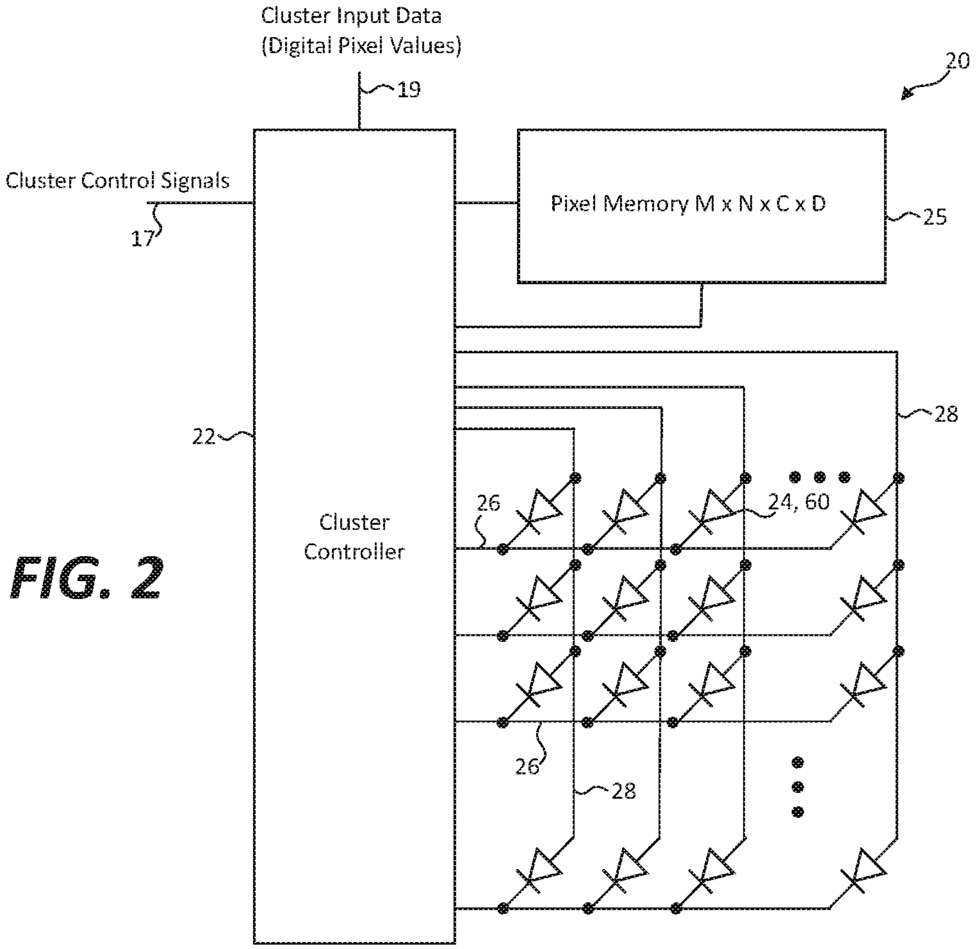
FIG. 2 is a schematic diagram of a pixel cluster comprising a pixel memory, cluster controller, and pixels comprising light emitters according to illustrative embodiments of the present disclosure.

According to some embodiments of the present disclosure and as illustrated in FIG. 1 and FIG. 2, a hybrid display 90 comprises pixel clusters 20 distributed over a display substrate 10, for example in a regular array forming a display area 12 on display substrate 10. Each pixel cluster 20 can comprise a group of pixels 24 comprising light emitters 60, for example arranged in a regular array over display substrate 10, a pixel memory 25 for storing fewer than two pixel values for each of pixels 24 in each pixel cluster 20, and a cluster controller 22 operable to control pixels 24 through cluster row wires 26 connecting rows of pixels 24 and cluster column wires 28 connecting columns of pixels 24 to emit light corresponding to the pixel values, receive pixel values, and store the pixel values in pixel memory 25. Pixels 24 are passive-matrix pixels and do not include any pixel value storage in pixel 24. Instead, pixel clusters 20 each comprise pixel memory 25 and cluster controller 22 for passive-matrix controlling pixels 24 with pixel values stored in pixel memory 25.

Pixel clusters 20 can be, but are not necessarily, spatially separate and non-overlapping so that nothing in a pixel cluster 20 is disposed spatially within an area of display substrate 10 that includes another, different pixel cluster 20. Pixel memory 25 of a pixel cluster 20 comprises all of the pixel values stored in pixel cluster 20 necessary to output and display the pixel values. Pixel memory 25 storage is the amount of pixel data that pixel memory 25 can store and does not include any buffering or pixel value storage necessary to input pixel values to pixel cluster 20. Pixel memory 25 includes only memory devices necessary to store pixel values and control pixels 24 to emit light corresponding to the stored pixel values. Thus, according to embodiments of the present disclosure, a hybrid display 90 comprises pixels 24 divided into mutually-exclusive groups (pixel clusters 20). Each pixel cluster 20 comprises multiple pixels 24 controlled with a cluster controller 22 as passive-matrix pixels 24 that do not include any memory in the pixel. Instead, cluster controller 22 comprises pixel memory 25 storing the pixel values corresponding to each pixel 24.

A display controller 14 can be operable to provide pixel values to cluster controllers 22 for example through a display row controller 16 and display column controller 18 responsive to pixel-value receiver 15. In embodiments of the present disclosure, the pixel values are digital values and each of cluster controllers 22 is operable to receive pixel values from display controller 14 and store the pixel values in pixel memory 25 at the same time that cluster controller 22 controls pixels 24 to emit light corresponding to the pixel values. The display is a hybrid display 90 because, although pixels 24 in each pixel cluster 20 are controlled as passive-matrix pixels 24, each pixel cluster 20 stores pixel values corresponding to pixels 24 of pixel cluster 20 and the pixel clusters 20 are therefore active-matrix. Externally, hybrid display 90 appears to operate as an active-matrix display.

According to embodiments of the present disclosure, display substrate 10 can be any substrate on which cluster controller 22, pixel memory 25 and pixels 24 can be disposed and electrically interconnected, for example glass, plastic, semiconductor, ceramic, or sapphire substrates or substrates useful in flat-panel displays or wafers used in the construction of integrated circuits and suitable for photolithographic processes. Display controller 14 can comprise one or more control and data circuits, for example integrated circuits comprising silicon CMOS circuits. In some embodiments, display controller 14 comprises a display row controller 16 for providing signals such as control signals to cluster controllers 22 of pixel clusters 20, for example through display row wires 17 electrically connected to rows of pixel clusters 20, a display column controller 18 for providing signals such as data signals (e.g., digital pixel values) to cluster controllers 22 of pixel clusters 20, for example through display column wires 19 electrically connected to columns of pixel clusters 20, and a pixel-value receiver 15 that receives digital pixel values corresponding to pixels 24 in an image from an external source. Pixel-value receiver 15 can transmit digital pixel values to display row and column controllers 16, 18, as well as transmit control and timing signals. Any one or more of display row controller 16, display column controller 18, and pixel-value receiver 15 can be integrated circuits, for example silicon CMOS circuits or mixed signal circuits made using photolithographic methods and materials suitable for providing data and control signals to cluster controller 22. Any one or more of display row wires 17, display column wires 19, cluster row wires 26, and cluster column wires 28 can be disposed on display substrate 10 using photolithographic methods and materials, for example patterned metal conductors deposited by metal evaporation and photoresist mask patterning. The dashed lines in FIG. 1 for the display row wires 17 and the ellipses in FIG. 2 for pixels 24 indicate that the array of pixel clusters 20 and pixels 24 are not limited by the illustration of two-by-two pixel clusters 20 in hybrid display 90 and four-by-four pixels 24 in a pixel cluster 20 and can comprise arrays of pixels 24 within pixel clusters 20 and of pixel clusters 20 in hybrid display 90 of any desired and arbitrary size.

Any one or more of cluster controller 22 and pixel memory 25 can be integrated circuits, for example silicon CMOS circuits or mixed-signal circuits made using photolithographic methods and materials. Cluster controller 22 can be a state machine, can comprise digital logic, or can be a programmable micro-controller. Cluster controller 22 can be operable to receive control and data signals (e.g., digital pixel values) from display row and column controllers 16, 18, write and receive digital pixel values to and from pixel memory 25, and control pixels 24 to emit light corresponding to the digital pixel values stored in pixel memory 25 through cluster row wires 26 and cluster column wires 28, e.g., using passive-matrix control.

Display column controller 18 can be, for example, an integrated circuit that provides control, timing (e.g., clocks)

or pixel values (e.g., column-data signals) through display column wires 19 (column-data lines) to columns of pixel clusters 20 to enable light emitters 60 to control light in hybrid display 90. Each display column wire 19 can be electrically separate and optionally independently controlled from every other display column wire 19 by display column controller 18. Display column controller 18 can comprise a single integrated circuit or can comprise multiple integrated circuits, e.g., electrically connected integrated circuits. The integrated circuit(s) can be micro-transfer printed onto display substrate 10 as unpackaged dies and can comprise fractured or separated tether(s).

Display row controller 16 can be, for example, an integrated circuit that provides control signals (e.g., row-select signals) and/or timing signals (e.g., clocks or timing signals such as pulse-width modulation (PWM) signals) through display row wires 17 (row-select lines) to rows of pixel clusters 20 to cause light emitters 60 to control light in hybrid display 90. Each display row wire 17 can be electrically separate and optionally independently controlled from every other display row wire 17 by display row controller 16. Display row controller 16 can comprise a single integrated circuit or can comprise multiple integrated circuits, e.g., electrically connected integrated circuits. The integrated circuit(s) can be micro-transfer printed onto display substrate 10 as unpackaged dies and can comprise broken (e.g., fractured) or separated tether(s).

Pulse-width modulation (PWM) is a control method that uses temporally sequential pulses (digital signals) of different periods (typically relative powers of two). Each pulse can be combined with a bit of a luminance value having a place (e.g., power of two) corresponding to the period of the pulse to provide a control signal, for example to control light emitters 60 to emit light with a constant current during the pulse period. As used herein, a PWM cycle is the time required to temporally output all of the pulses corresponding to a luminance signal (e.g., $256=2^8$ for an eight-bit luminance value).

Pixels 24 can each comprise one or multiple light emitters 60, such as light-emitting diodes. In some embodiments, light emitters 60 can comprise light-emitting diodes, e.g., inorganic light-emitting diodes such as horizontal inorganic light-emitting or vertical inorganic light-emitting diodes. In embodiments of the present disclosure inorganic light-emitting diodes can be micro-inorganic-light-emitting diodes. Inorganic light-emitting diodes can have a small area, for example having a length and a width each no greater than 5 microns, no greater than 10 microns, no greater than 20 microns, no greater than 50 microns, no greater than 100 microns, or no greater than 200 microns. Inorganic light-emitting diodes can have a small thickness, for example having a thickness no greater than 50 microns, no greater than 20 microns, no greater than 10 microns, no greater than 5 microns, or no greater than 2 microns. Such small light emitters 60 leave additional area on display substrate 10 for more or larger wires, e.g., display column wires 19, display row wire 17, or ground and power wires, or circuits, e.g., cluster controllers 22.

Pixels 24 can comprise a red light-emitting diode that emits red light, a green light-emitting diode that emits green light, and a blue light-emitting diode that emits blue light (collectively light-emitting diodes or LEDs) under the control of cluster controller 22. In certain embodiments, light emitters 60 that emit light of other color(s) are included in pixel 24, such as a yellow light-emitting diode. Light-emitting diodes can be mini-LEDs (e.g., having a largest dimension no greater than 500 microns) or micro-LEDs (e.g., having a largest dimension of less than 100 microns). Pixels 24 can emit one color of light or white light (e.g., as in a black-and-white hybrid display 90) or multiple colors of light (e.g., red, green, and blue light as in a color hybrid display 90). Pixel clusters 20 can comprise multiple elements disposed and electrically connected directly on display substrate 10. Pixel clusters 20 can comprise multiple elements disposed and electrically connected on a cluster substrate non-native to (e.g., separate and independent from) display substrate 10 with the cluster substrate disposed on display substrate 10. In some embodiments, one or more pixel clusters 20 include one or more elements disposed and electrically connected directly on display substrate 10 and one or more elements disposed and electrically connected on a cluster substrate non-native to display substrate 10 (e.g., and electrically interconnected with the one or more elements disposed and electrically connected directly on display substrate 10 with one or more electrical connections, which can include one or more vias).

Cluster controller 22 can comprise one or more integrated circuits, for example one or more micro-devices. Any one or more of cluster controller 22 and LEDs can be micro-transfer printed onto display substrate 10 or onto a cluster substrate. Cluster controller 22 and LEDs can be connected with cluster row wires 26 connecting rows of light emitters 60 to cluster controller 22 or display row controller 16 and cluster column wires 28 connecting columns of light emitters 60 to cluster controller 22 or display column controller 18. A cluster substrate can be micro-transfer printed from a cluster source substrate onto display substrate 10 and electrically connected to control signal wires (e.g., display row wires 17 or row-control lines, display column wire 19, power, and ground signal wires) on display substrate 10. Micro-transfer printed devices or structures (e.g., LEDs, cluster controllers 22, or cluster substrates) can comprise broken (e.g., fractured) or separated tether(s) as a consequence of micro-transfer printing from a source to a target substrate.

According to some embodiments of the present disclosure, a cluster controller 22 receives column-data signals (e.g., pixel values) from display column controller 18 through display column wire 19 and row-select signals (e.g., timing or control signals) from display row controller 16 through display row wire 17. When a pixel cluster 20 is selected by a row-select signal on display row wire 17, pixel values received on display column wire 19 can be stored in pixel memory 25 by cluster controller 22 at the same time as cluster controller 22 outputs pixel values from pixel memory 25 to control light emitters 60 to emit light.

Pixel memory 25 can be a static random-access memory (SRAM) or one or more registers, e.g., comprising one or more flipflops, latches, or memory cells. Registers of pixel memory 25 can be shift registers, for example serial shift registers or parallel shift registers, or registers that can receive data in parallel and output data serially, or vice versa. In some embodiments, pixel memory 25 does not include any storage providing buffers for inputting and temporarily storing pixel values received from display controller 14 prior to storing the received pixel values in pixel memory 25 and outputting the pixel values from pixel memory 25. Pixel memories 25 in pixel cluster 20 store fewer than twice as many pixel values as pixels 24 in pixel cluster 20. Thus, pixel memory 25 cannot be a double-buffered memory and cannot have two memory banks where each memory bank stores all of the pixel values for pixel cluster 20 corresponding to an image frame. An image frame is an entire image comprising pixel values for display with pixels 24 in hybrid display 90. Image frames are typically successive, e.g., are supplied in a temporal stream as in a typical video image sequence.

Embodiments of the present disclosure are intended to provide a memory architecture for a pixel memory 25 in each pixel cluster 20 that has reduced size and reduced leakage and hence reduced power usage. In embodiments of the present disclosure, cluster controller 22 is operable to receive pixel values from display controller 14 and store the received pixel values in pixel memory 25 at the same time that pixels 24 emit light corresponding to pixel values, even though pixel memory 25 is not double buffered. In some conventional systems, the amount of memory required can be 2M rows of pixel data whereas embodiments of the present disclosure store fewer rows of pixel data than 2M in the display where M is the number of rows of pixels 24 in pixel cluster 20.

According to embodiments of the present disclosure, cluster controller 22 can be operable to input pixel data at an input rate and, at the same time or different times, output stored pixel data from pixel memory 25 at an output rate to control light emitters 60 to emit light corresponding to the pixel data. The output rate can be different from the input rate, and in some embodiments, the output rate is greater than the input rate, for example an integral multiple such as two, four, eight, sixteen, or $2^x$ times. In some embodiments, the input and output can be unsynchronized (asynchronous) or independent and an input (receipt or write of digital pixel values) does not affect the output (read and display of digital pixel values by light-emitters 60 in pixels 24) and vice versa. Such asynchronous operation enables input and output at different transmission rates, for example receiving digital pixel values (e.g., rows of pixel data) of an image frame at a greater input rate (e.g., in a burst mode) than an output rate displaying the digital pixel values stored in pixel memory 25 either at regular intervals or irregular intervals. For example, a portion of the digital pixel values of an image frame corresponding to pixels 24 in a pixel cluster 20 stored in pixel memory 25 can be displayed at 100 frames per second (e.g., pixel values in pixel memory 25 are displayed every 10 milliseconds) and digital pixel values of a subsequent image frame received from display controller 14 in 5 milliseconds at 10 millisecond intervals so that input is temporally discontinuous. In some embodiments, the input rate can be equal to the output rate so that the input frame rate is equal to the output frame rate. In some embodiments, the input rate can be less than the output rate so that pixel values can be output more than once while pixel values are input. In such embodiments, the input frame rate is less than the output frame rate, so frames are repeatedly displayed, for example in a refresh-on-demand hybrid display 90.

Pixels 24 in pixel clusters 20 can be controlled by cluster controller 22 using passive-matrix control so that pixels 24 are passive-matrix pixels 24. Each pixel 24 can include one or more light emitters 60, for example, inorganic micro-light-emitting diodes. Because pixels 24 are passive-matrix pixels 24 they do not include any memory or storage devices such as a random access memory, one or more flipflops, one or more latches, a serial shift register, a parallel shift register, or a serial-in/parallel-out shift register. Pixels 24 can each include multiple light emitters 60 that each emit light of a different color, for example red, green, and blue light when provided with pixel data and suitable control, power, and ground signals forming a picture element or pixel 24 in hybrid display 90). Each individual light emitter 60 in pixel 24 can be a sub-pixel of pixel 24 or can be included in a sub-pixel of pixel 24 (e.g., where redundant emitters for one or more colors are used). Embodiments of the present disclosure can reduce, eliminate, or avoid flickering or image artifacts, and can improve the appearance of image pixel data on hybrid display 90. Embodiments of the present disclosure provide reduced memory requirements for logically and temporally decoupled input and output pixel control methods in a display.

Pixels 24 in pixel clusters 20 can be disposed on display substrate 10 in a regular array such as a rectangular array, for example both within pixel clusters 20 and including all of pixels 24 in all of pixel clusters 20 in a regular two-dimensional array that, together, form display area 12. Cluster controllers 22 can be disposed on or over display substrate 10 between pixels 24 in a pixel cluster 20 or between pixel clusters 20, for example between adjacent rows or columns of pixels 24 in different pixel clusters 20 (as shown in FIG. 1). For example, micro-transfer printing can be used to dispose unpackaged dies from native source substrates to non-native display substrate 10, enabling very small cluster controllers 22, optionally with large aspect ratios (length to width) suitable for disposition between rows or columns of pixels 24. Pixels 24 in pixel clusters 20 can be mutually exclusive so that no pixel 24 in a pixel cluster 20 is in another pixel cluster 20 and are not interdigitated so that no pixel 24 in a pixel cluster 20 is between two pixels 24 of a different pixel cluster 20. Thus, embodiments of the present disclosure comprise more pixels 24 than pixel clusters 20 since each pixel cluster 20 comprises multiple pixels 24 and each pixel 24 is only a part of one pixel cluster 20. Such an arrangement of pixel clusters 20, light emitters 60, and cluster controllers 22 has been successfully physically and logically laid out on display substrate 10.

Digital pixel values are received by pixel-value receiver 15, for example from an external image source. Each digital pixel value includes all of the information necessary to control all of light emitters 60 in a single pixel 24. For example, each digital pixel value can include D binary bits where D is the number of bits (the bit depth) in a digital luminance value used to control a single light emitter 60, for example, 8 bits 12 bits, or 16 bits. The bit depth D of a binary digital pixel value specifies the number of luminance levels (equal to $2^D$) at which light emitters 60 can emit light. If each pixel 24 comprises C light emitters 60, for example three light emitters 60 that each emit one of red, green, and blue light, then the pixel value for each pixel 24 has C×D bits, for example 24 bits (three colors×eight-bit luminance value), 36 bits (three colors×twelve-bit luminance value), or 48 bits (three colors×sixteen-bit luminance value) organized in three digital luminance values of eight, twelve, or sixteen bits each, respectively. Pixel memory 25 stores at least one digital pixel value for each pixel 24 in pixel cluster 20. If pixel 24 has only one light emitter 60, then C=1 and the pixel value has one luminance value so that the pixel value and the luminance value are equivalent. The term pixel data refers herein to any of pixel values, luminance values, or one or more bits of a pixel value.

Each pixel cluster 20 can comprise M by N pixels 24, e.g., arranged in M rows by N columns, each having C light emitters, so that pixel memory 25 stores M×N digital pixel values each having C luminance values (one for each emitter)×D bits for each luminance value for a storage of at least M×N×C×D bits. (Individual rows M, columns N, colors C, and bits D are referenced generally from 0 to (M−1), (N−1), (C−1), and (D−1), respectively.) In embodiments of the present disclosure, pixel values for pixels 24 in pixel clusters 20 can be disposed in an array of M rows and N columns, wherein M is no less than two and N is no less than one, and pixel memory 25 stores received pixel values in an M×N array having unique row addresses ranging from at least (or only) from zero to (M−1). In some embodiments, a larger pixel memory 25 has row addresses from zero to M, thereby facilitating data loading using the extra row address.

Luminance value bits of each pixel value in pixel memory 25 can be organized in different logical arrangements at different pixel memory 25 addresses for different embodiments of the present disclosure. In some embodiments, pixel memory 25 has M×D unique row addresses and each row address accesses (e.g., can be used to read or write) C×N bits in pixel memory 25 so that each unique row address accesses (e.g., inputs or outputs) a single bit of each luminance value in each pixel value, for example for memory architectures shown in FIGS. 3 and 7 and as illustrated in FIG. 4. In some such embodiments, each unique row address of pixel memory 25 accesses (e.g., reads or writes) a bit for each of N columns of light emitters 60 in a row of pixels 24 in the array of pixels 24 in pixel cluster 20, e.g., C bits for each column of N columns of pixels 24 in the array of pixels 24 in pixel cluster 20. Thus, cluster controller 22 can be operable to sequentially output single bits of each pixel value in a row of pixel values from pixel memory 25 with successive row addresses and control pixels 24 to emit light corresponding to the single bits. Moreover, in some embodiments, cluster controller 22 can be operable to write a pixel value into pixel memory 25 between or during the output of a single bit in a pixel value, e.g., during a PWM pulse or between PWM pulses in a PWM cycle.

Figure 5:
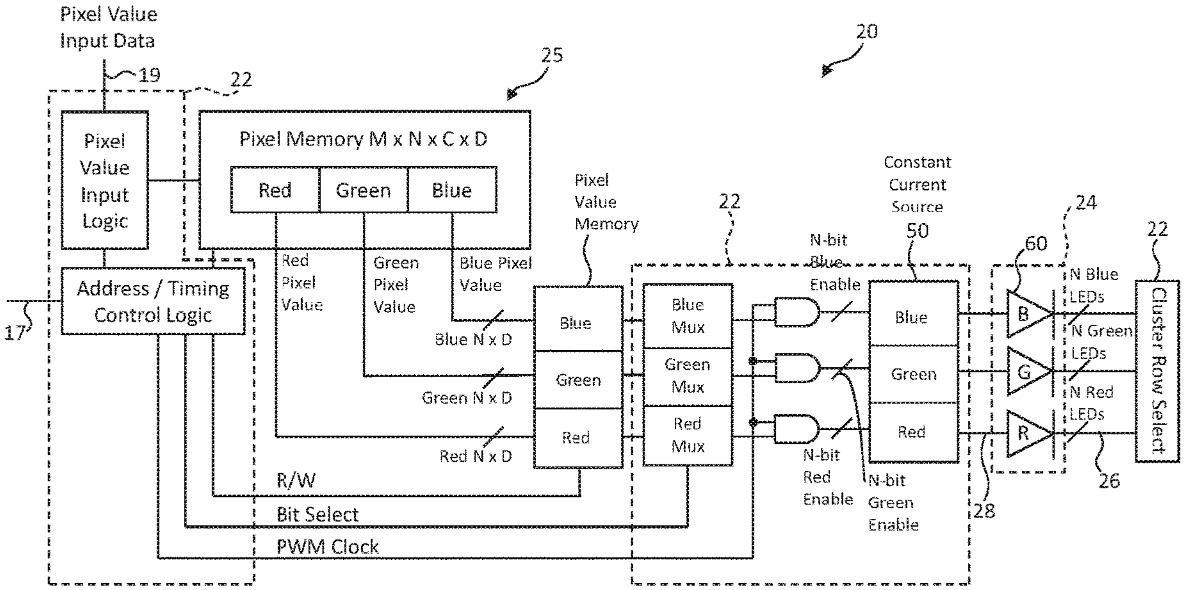
FIG. 5 is a schematic diagram of a pixel cluster comprising a pixel memory, cluster controller, and pixels comprising light emitters according to illustrative embodiments of the present disclosure.
Figure 6:
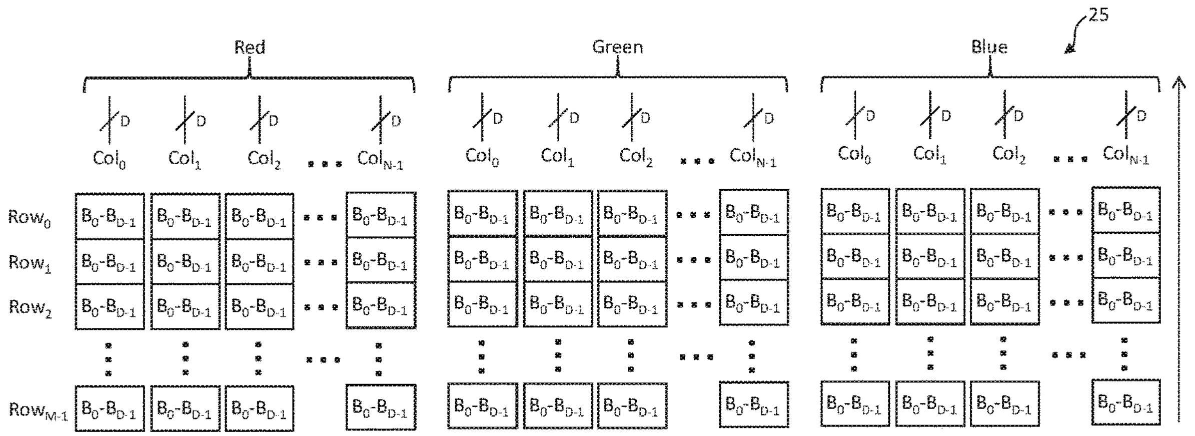
FIG. 6 is a schematic block diagram corresponding to FIG. 5 of a pixel memory organized to output columns of pixel values for each unique address according to illustrative embodiments of the present disclosure.
Figure 8:
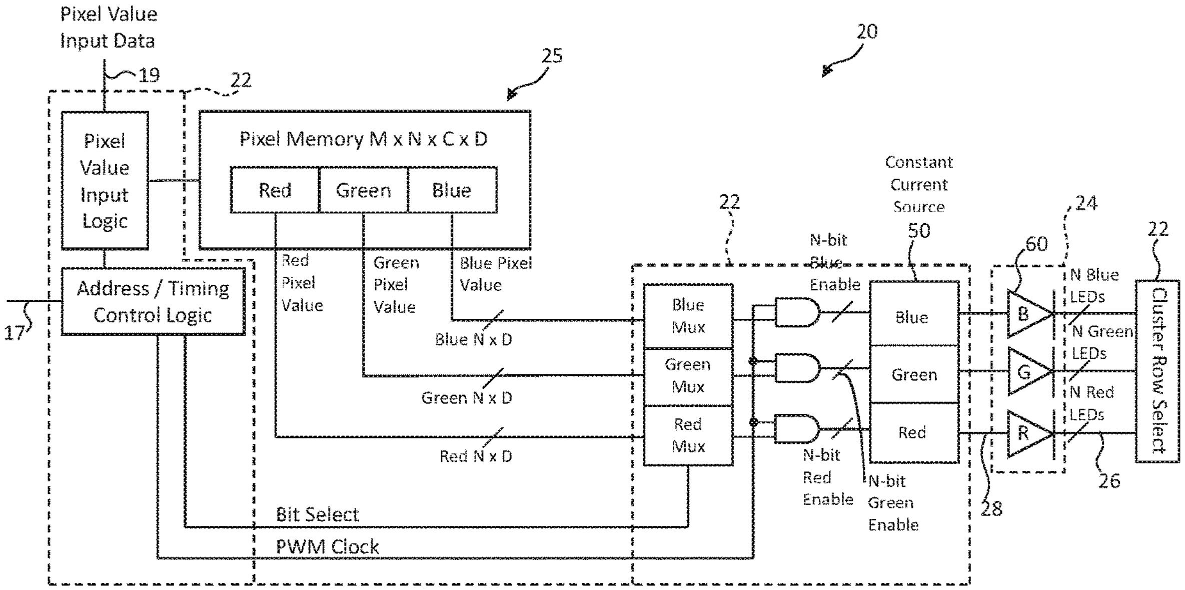
FIG. 8 is a schematic diagram of a pixel cluster comprising a pixel memory corresponding to FIG. 6, cluster controller, and pixels comprising light emitters according to illustrative embodiments of the present disclosure.

In some embodiments, pixel memory 25 has M unique row addresses and each row address stores N pixel values, where each pixel value has C×N luminance values and C×N×D bits, for example for memory architectures shown in FIGS. 5 and 8 and as illustrated in FIG. 6. In some such embodiments, each unique row address of pixel memory 25 accesses (e.g., reads or writes) an entire luminance value for each of the columns of light emitters 60 in a row of pixels 24 of the array of pixels 24 in the pixel cluster 20, e.g., an entire pixel value for each column of pixels 24 in the array of pixels 24 in the pixel cluster 20.

Conventional analog displays can use capacitors to store analog values as charges that control drive transistors for light emitters. When updated, the capacitors can monotonically change from a prior charge to an updated charge so that the light emitted likewise changes monotonically from a prior luminance to an updated luminance for a successive image frame avoiding pixel display artifacts. Moreover, the capacitors can control an output transistor at the same time that an input transistor modifies the charge on the capacitor, that is data in the capacitor circuit (charge) can be read from and written to at the same time. Embodiments of the present disclosure implement such a capability using digital pixel values, a digital memory, digital input and output circuits, and digital light emitter 60 drive control, e.g., using constant-current pulse-width modulation control.

In contrast to digital circuits of the present disclosure, analog storage (e.g., capacitors) and control methods can require a relatively large area of a semiconductor integrated circuits and experience significant charge leakage, especially for thin-film transistor circuits commonly found in flat-panel displays, thereby increasing costs and power usage while reducing resolution. Moreover, simple analog circuits do not provide a constant-current light emitter control and more complex analog circuits use more area over a display substrate 10, limiting display resolution. A similar update for displays using digital storage with smaller components and less leakage is conventionally performed by outputting pixel values stored in a first memory bank while updated data is received and stored in a second independent memory bank, e.g., together defining a double-buffered memory system. At the end of a display cycle (image frame display period), the memory banks are switched so that pixel values from the second memory bank are output while updated pixel values from a next image frame are stored in the first memory bank. However, two memory banks, one for pixel values for each of two image frames requires twice the area of a semiconductor integrated circuit, twice the power, twice the charge, and results in twice the current leakage. Thus, embodiments of the present disclosure provide pixel control with reduced pixel memory 25 area (and cost) as well as reduced power usage, and increased resolution.

In embodiments of the present disclosure, cluster controller 22 controls passive-matrix pixels 24 using pulse-width modulation having temporally variable pulses of constant current. Constant-current control is useful for light emitters 60 comprising inorganic light-emitting diodes because inorganic light-emitting diodes are most efficient at a particular current. Thus, operating the inorganic light-emitting diodes at a particular current of maximal or near maximal efficiency reduces power use in pixels 24 for a desired amount of output light. Variable luminance for the pixels 24 is accomplished by emitting light at the most efficient current for variable amounts of time equal to an image frame period at a fast enough rate that the human visual system perceives an average luminance over the image frame period.

Figure 3:
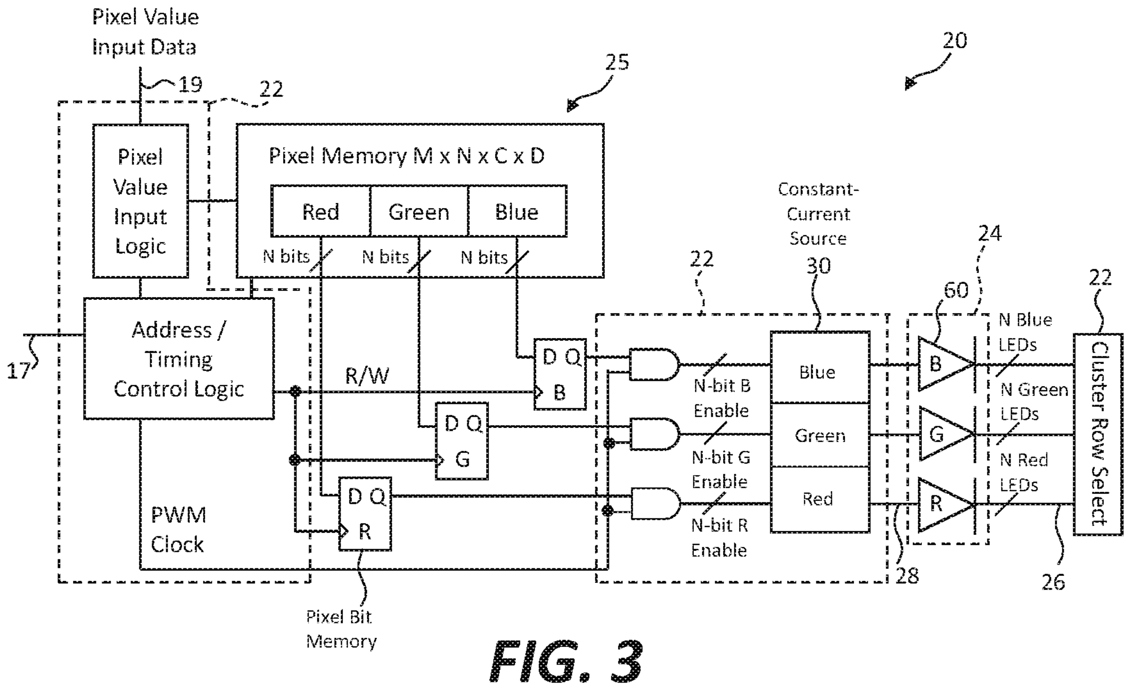
FIG. 3 is a schematic diagram of a pixel cluster comprising a pixel memory, cluster controller, and pixels comprising light emitters according to illustrative embodiments of the present disclosure.
Figure 4:
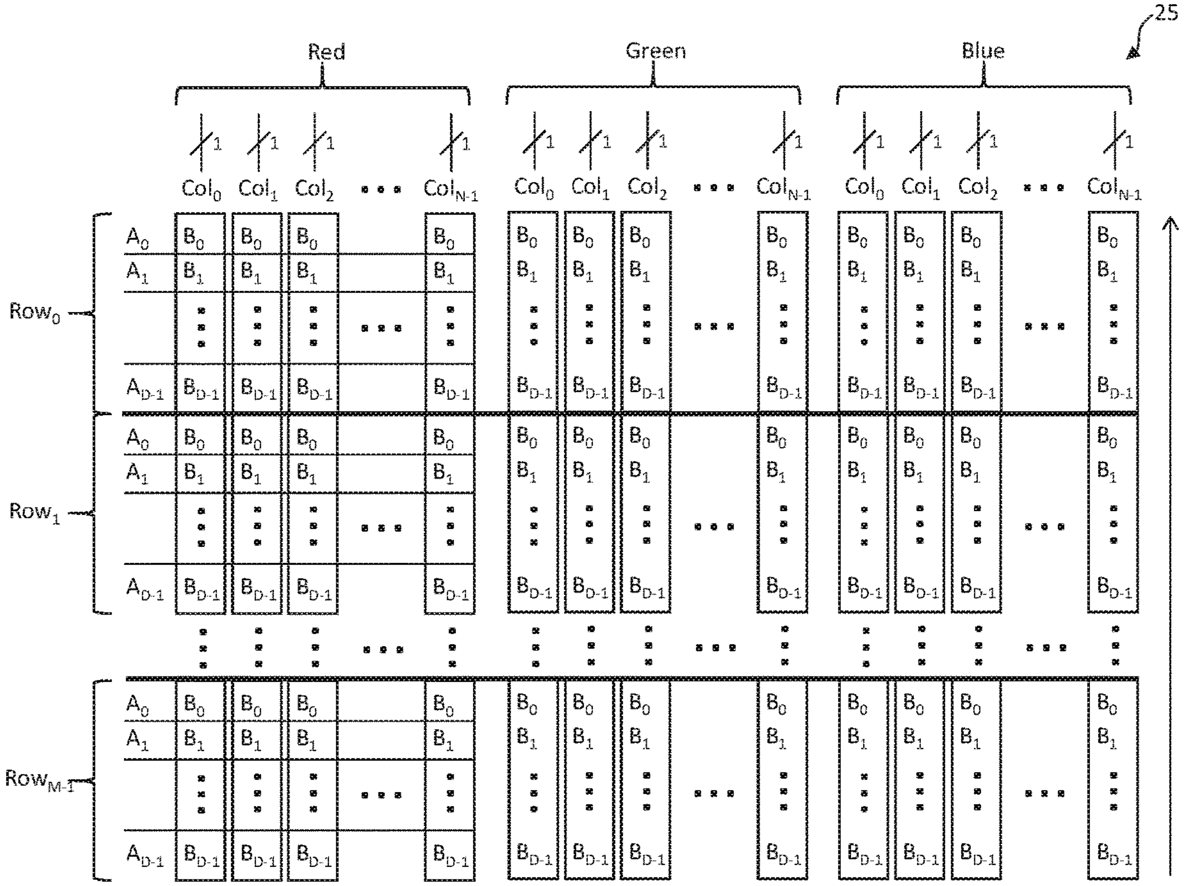
FIG. 4 is a schematic block diagram corresponding to FIG. 3 of a pixel memory organized to output a column of single bits for each unique address according to illustrative embodiments of the present disclosure.

According to embodiments of the present disclosure and as shown in FIG. 3, a pixel cluster 20 comprises cluster controller 22, pixel memory 25, and pixels 24. Cluster controller 22 includes all of the control logic in pixel cluster 20 except for pixel memory 25 and pixels 24. Pixels 24 can comprise light emitters 60. FIG. 3 illustrates a single pixel 24 having red, green, and blue light-emitters 60 (e.g., inorganic light-emitting diodes) that emit red, green, and blue light, respectively in response to a constant current provided by constant-current source 30 of cluster controller 22 corresponding to a pixel value representing the desired light output from pixel 24. In embodiments of the present disclosure, pixels 24 are controlled with pulse-width modulation. As used herein, pulse-width modulation refers to any temporally variable constant current drive method, including, for example, pulse-density modulation. However, for simplicity and clarity of understanding, the examples given use a conventional binary-encoded pixel values with constant-current pulses having a relative temporal length of $2^{(D-1)}$ where D is the number of bits corresponding to a light emitter 60 in pixel 24 for a given pixel value. (By way of example, if the number of light emitters 60 in pixel 24 is one, then the pixel value and the luminance value have D bits. As another example, if the number of light emitters 60 is three, then the luminance value has D bits and the pixel value has 3×D bits.)

FIG. 3 illustrates an efficient embodiment of the present disclosure using pixel memory 25 with pixel values organized as shown in FIG. 4. As illustrated, pixel cluster 20 comprises an array of M rows by N columns of pixels 24. Each pixel 24 comprises three light emitters 60. The number of luminance levels is specified as D so that pixels 24 can emit light at $2^D$ different luminance levels (e.g., 256 levels, from zero to 255, where D equals eight). Thus, pixel memory 25 includes at least M×N×D×C bits and fewer than M×N×D×C×2 bits. To facilitate pixel value display, pixel memory 25 is organized with a single bit d per column per color C per memory address, as in FIG. 4. For example, if the number of columns N equals four and the number of colors of light emitters 60 in a pixel 24 is three, then the memory has three times four output lines, e.g., a 12-bit output, corresponding to each address provided.

In embodiments of the present disclosure and as illustrated in FIG. 3, the successive bits of pixel values output from pixel memory 25 can be stored in additional pixel memory 25 locations, for example a flipflop, latch or register, during display of the bits. Thus, in some such embodiments of the present disclosure, bits for each pixel value in a row of pixel values in pixel memory 25 (each corresponding to a unique column within the row) are copied into a storage register or SRAM that is part of pixel memory 25 (so that pixel memory 25 stores an additional N×C bits). (Pixel memory 25 includes all storage used to output pixel values to pixels 24.) In some such embodiments, pixel memory 25 includes an additional (N×C) bits, totaling ((M×N×D×C)+(N×C)) bits. Generally, cluster controller 22 is operable to (i) read output pixel data stored at row address $I_{OUTPUT}$ of pixel memory 25 ($I_{OUTPUT}$<M) and copy the pixel data into pixel memory 25 at row address $I_{OUTPUT2}$ where ($I_{OUTPUT} \neq I_{OUTPUT2}$).

FIG. 4 illustrates a logical organization of pixel values in pixel memory 25 for each of the colors of light emitters 60 (illustrated as three colors, red, green, and blue). Address 0 ($A_0$) of Row 0 selects the first row memory locations storing bit 0 (bit d=0) of the luminance values for each color. Address 1 ($A_1$) of Row 0 selects the second row memory locations storing bit 1 (bit d=1) of the luminance values for each color, and so forth until Address (D−1) ($A_{D-1}$) selects memory location D−1 (bit d=D−1) of pixel memory 25. In operation and at the same that the bits of memory are sequentially selected, cluster controller 22 selects Row 0 of pixels 24 and provides a constant current to light emitters 60 in Row 0 for a relative period of time corresponding to the bit d of the pixel value (e.g., a temporal PWM pulse period equal to 1, 2, 4, 8 . . . $2^{D-1}$) to cause light emitters 60 of Row 0 to emit light for each of the periods where the bit is one (on). Subsequently, Row 1 of pixel 24 is selected by cluster controller 22 and addresses 0 to D−1 of Row 1 of pixel memory 25 are sequentially selected, e.g., address D+0, D+1, D+2 . . . D+D−1. More generally, the address for pixel memory 25 corresponding to a pixel value bit d in a Row M is ((M×D)+d) where Row M is selected to enable light emitters 60 in Row M to emit light. The arrow in FIG. 4 conceptually illustrates bits of the pixel values "shifting" out of pixel memory 25 as addresses sequentially applied to pixel memory 25 increase from the address for Row 0 bit 0 to Row (M−1) bit (D−1) (although, as shown, pixel memory 25 is not a shift register). Pixel memory 25 can be sequentially written (input) in a similar fashion.

When combined with a PWM control signal (e.g., a pulse), the additional bit storage can enable a constant-current source 30 to cause light emitters 60 to emit light. By using the additional pixel memory 25 storage, pixel memory 25 can input and receive pixel values from display controller 14 (e.g., a subsequent image frame) at the same time that light emitters 60 emit light, for example from the same row of pixels 24 for which pixel memory 25 receives subsequent pixel values where pixel memory 25 cannot both input and output pixel values at the same address at the same time. To avoid input/output (e.g., read/write) conflicts for a memory address of pixel memory 25 that can lead to perceptible image artifacts, it is helpful if the read or write time for pixel memory 25 is smaller, preferably much smaller, than the smallest temporal period of the PWM signal, e.g., an amount of time to write pixel values into pixel memory 25 is less than a shortest pulse of the pulse-width modulation control signal, e.g., corresponding to the least-significant bit of a luminance value.

FIGS. 3 and 4 illustrate embodiments in which pixel memory 25 is organized to output (or input) data for each bit of a pixel value at a time with a corresponding unique row address. In some embodiments and as illustrated in FIGS. 5 and 6, pixel values are input or output as a complete value so that all of the bits in a pixel value are read or written at a same time in parallel. This reduces any potential conflict between reading and writing data to pixel memory 25 by a factor of D (since only one read or write cycle is needed for each pixel value rather than D read or write cycles for each pixel value and corresponding to each bit in the pixel value) at the cost of additional output data storage and additional wires for the integrated circuit comprising pixel memory 25. FIG. 5 shows embodiments in which pixel memory 25 includes an additional storage equal to D×N×C bits, e.g., a luminance value for each color of light emitter 60 in each column of pixels 24, for a total pixel memory 25 bit storage of ((M+1)×N×D×C).

As shown in FIG. 5, each pixel value corresponding to an address of pixel memory 25 is output, copied, and stored in a pixel value register (an independently accessible portion of pixel memory 25) having N×D×C storage bits so that pixel memory 25 can input pixel values at the same time that pixel cluster 20 can output pixel values (since after the initial pixel value read from pixel memory 25, pixel memory 25 can input pixel values). The individual bits of the read pixel value can be sequentially selected (e.g., by a multiplexer under the control of cluster controller 22) and combined with a PWM pulse to provide a signal enabling constant-current source 30 to drive light emitters 60 to emit light.

FIG. 6 illustrates the logical allocation of pixel memory 25 to pixel values correspond to the portion of an image frame stored in pixel cluster 20. As shown in FIG. 6, each unique memory address of pixel memory 25 accesses (inputs or outputs) entire pixel values for each column N of pixels 24 having C light emitters 60, totaling N×C×D bits. As with FIG. 4, subsequent rows of pixel values are stored in subsequent locations (row addresses) in pixel memory 25. Generally, the row address for pixel memory 25 corresponding to an entire pixel value of D bits is M where row m is selected to enable light emitters 60 in row m to emit light. The arrow in FIG. 6 conceptually illustrates entire pixel values "shifting" out of pixel memory 25 as row addresses sequentially applied to pixel memory 25 increase from the address for row 0 to row (M−1) (although, as shown, pixel memory 25 is not a shift register). Pixel memory 25 can be sequentially written (input) in a similar fashion.

FIGS. 3 and 5 illustrate pixel memories 25 with more than a single memory buffer for an image frame (or the portion of the image frame stored in a given pixel cluster 20) but less than a double-buffered memory. In embodiments of the present disclosure, pixel memory 25 can be a single-buffered pixel memory 25 that has only enough storage for each pixel value corresponding to pixels 24 in pixel cluster 20 without any additional memory storage to output pixel values to light emitters 60 of pixels 24. (Pixel memory 25 does not include any pixel value buffering or storage necessary to input the pixel values.) In some such embodiments, pixel memory 25 has storage for only M×N×C×D bits.

Figure 7:
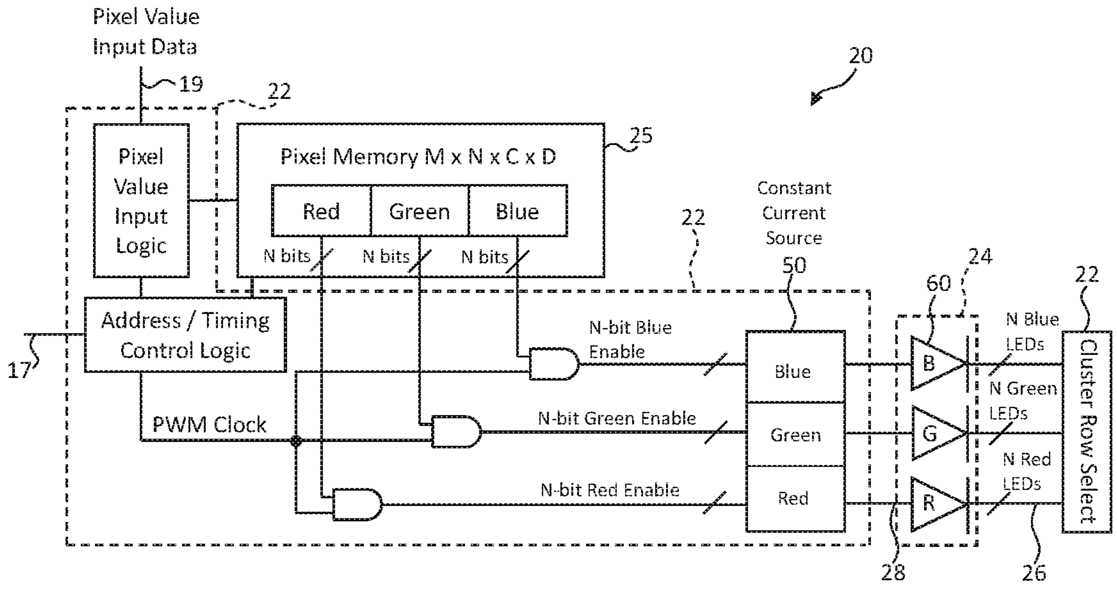
FIG. 7 is a schematic diagram of a pixel cluster comprising a single-buffer pixel memory corresponding to FIG. 4, cluster controller, and pixels comprising light emitters according to illustrative embodiments of the present disclosure.

FIG. 7 illustrates embodiments corresponding to the logical storage of pixel values in pixel memory 25 corresponding to FIG. 4. As shown in FIG. 7, sequential bits of pixel values can be output from pixel memory 25 and (together with the PWM pulse signal corresponding to the bit output)

directly control constant-current source 30 to drive light emitters 60 of pixels 24 without the additional bit storage used in FIG. 3.

Similarly, FIG. 8 illustrates embodiments corresponding to the logical storage of pixel values in pixel memory 25 corresponding to FIG. 6. As shown in FIG. 8, sequential pixel values can be output from pixel memory 25 and (together with a multiplexer to select the desired bit and the PWM pulse signal corresponding to the bit output) directly control constant-current source 30 to drive light emitters 60 of pixels 24 without the additional pixel value storage used in FIG. 5.

In some embodiments, a conflict between reading and writing the same row of pixel values can be resolved by preventing the writing (input) of the new pixel values. This can result in a displayed frame having a portion (e.g., a row) of a first image frame and a portion (e.g., one or more rows) of a second image frame that is subsequent to the first image frame. If the image frames are regularly received by pixel cluster 20 from display controller 14, a following image frame can then update the unwritten row, for example as is commonly the case for video image streams. (At sufficiently high frame rates such effects will be unnoticeable or negligibly noticeable to a viewer. However, if a display is only refreshed on demand, such an interlaced displayed image frame may not be desired.) Such an update method can be accomplished by comparing an input row address to an output row address and writing the new pixel values in the input row only if the input and the output row addresses do not match. In some such embodiments, cluster controller 22 can be operable to (i) receive an address of input pixel values, (ii) compare the address of the input pixel values to an address of a row of output pixel values that are controlled to emit light, and (iii) (a) if the input address does not match the output address, write the input pixel values into the pixel memory or (b) if the input address does match the output address, not write the input pixel values into the pixel memory.

Figure 9:
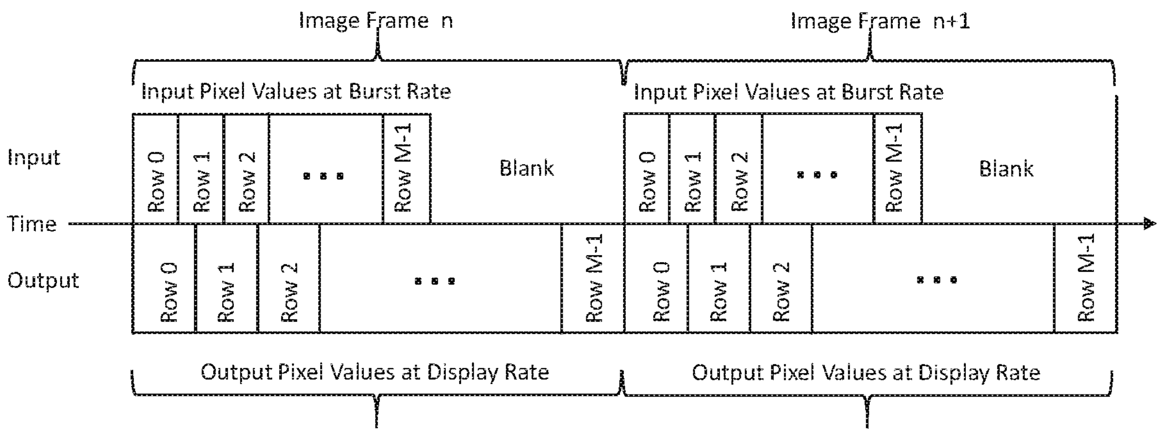
FIG. 9 is a timing diagram showing pixel value input and output for successive image frames according to illustrative embodiments of the present disclosure.

In the embodiments of FIGS. 7 and 8, it can be helpful if pixel memory 25 can read and write pixel values at the same time independently and asynchronously e.g., simultaneously and without interference, logically separating the input and output of pixel values into and out of pixel memory 25. Such input/output (read/write) independence allows pixel values to be input and output at arbitrary rates at arbitrary time, for example input and output out of phase or in a burst mode in which pixel values are quickly input at a rate greater than an output rate from an external image source at the same time that pixel values are output for display. (Such asynchronicity can be used, for example, where the time to write is much shorter than one or more pulses in a pulse-width-modulation signal that is read out.) FIG. 9 illustrates the process with a representative timeline. Successive image frames (pixel values corresponding to pixels 24) having a frame period are input to pixel memory 25 during only a first portion of the frame period (e.g., faster than at an image frame rate) as shown above the timeline at the same time that pixel values are output at the image frame rate (e.g., over the entire frame period) as shown below the timeline. The time required to input a row of pixel data is indicated (above the timeline) and the time required to output (display) a row of pixel data is indicated (below the timeline). The time required to output the pixel values is greater than the time required to input the pixel values, leaving a blank period during each image frame during which no pixel values are input but during which pixel values continue to be output. As shown in FIG. 9, at some times, pixel values are both input and output from the same pixel memory 25 storage locations. Although the phase difference between the input and output is shown to be zero (inputting pixel values for an image frame starts at the same time that outputting pixel values starts), in general any phase difference can be practiced. Indeed, phase difference can vary from frame to frame. Thus, it is possible in such embodiments that pixel memory 25 input and output for a storage location must be done simultaneously for at least some period of time.

The embodiments illustrated in FIGS. 3 and 5 accomplish this by storing a copy of output data (bits of a pixel value as shown in FIG. 3 or entire pixel values as shown in FIG. 5) in storage of pixel memory 25 additional to a single image frame of pixel values. The embodiments of FIGS. 7 and 8 do not have any pixel memory 25 storage additional to a single image frame of pixel values so that pixel memory 25 stores no more pixel values than a single image buffer. Therefore, in some such embodiments, pixel memory 25 storage can be no greater than a storage of N×M pixel values (equal to M×N×C×D bits).

Figure 10:
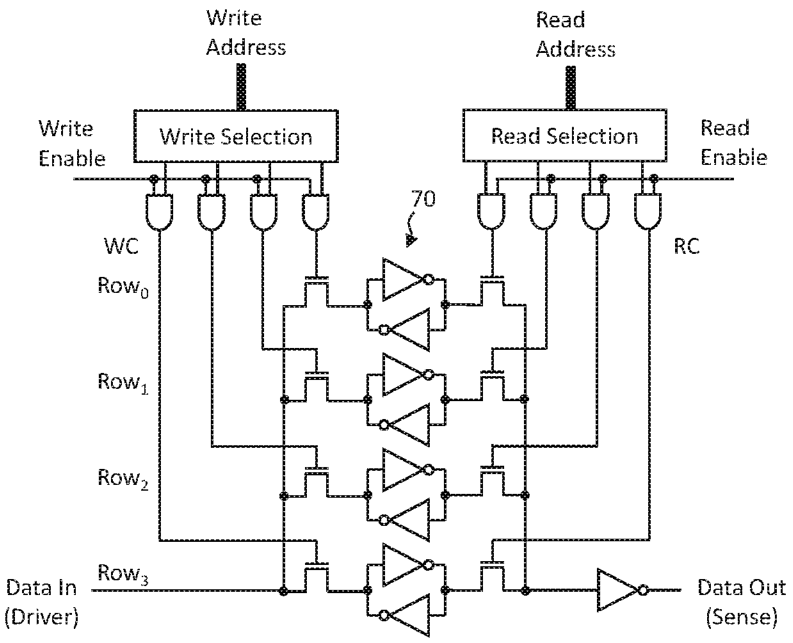
FIG. 10 is a simplified schematic of a partial pixel memory according to illustrative embodiments of the present disclosure.
Figure 11:
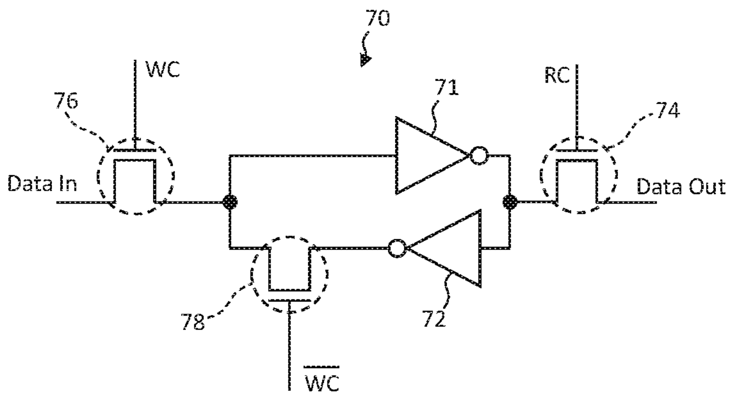
FIG. 11 is a simplified schematic of a single bit of a pixel memory according to illustrative embodiments of the present disclosure.
Figure 12:
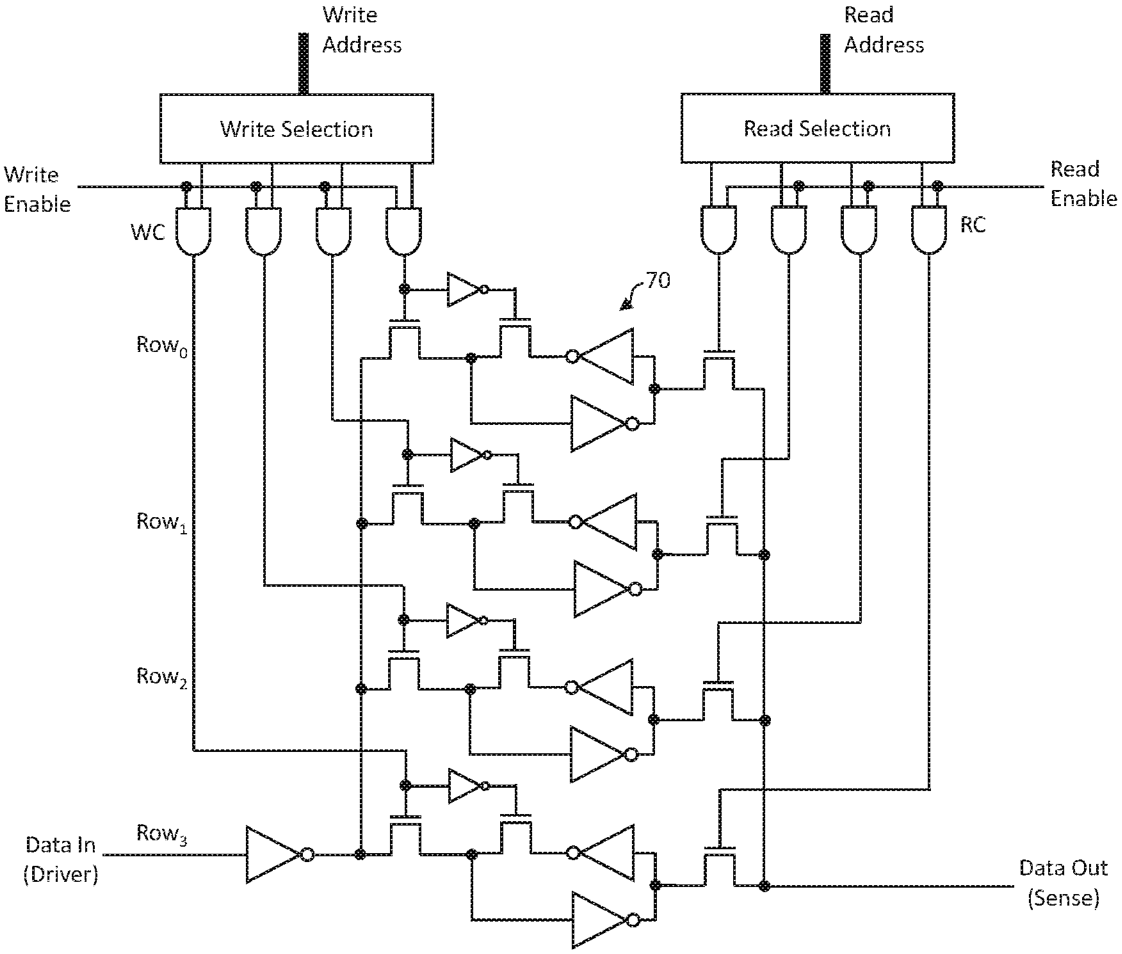
FIG. 12 is a simplified schematic of a partial pixel memory corresponding to FIG. 11 according to illustrative embodiments of the present disclosure.

Such embodiments can be implemented with, for example, pixel memory 25 as shown in FIGS. 10-12. FIG. 10 illustrates four rows of single-bit storage, e.g., four bit cells 70 for m=4. An entire pixel memory 25 would require N×C×D additional storage locations. FIG. 10 shows an SRAM bit cell 70 using pairs of invertors (logical NOT gates) connected input to output. Many other SRAM cell designs or bit storage circuits are known and can be included in the present disclosure. Conventional SRAM bit cells typically comprise six transistors and are controlled with differential signals that drive both sides of the inverter pair at once, preventing simultaneous read from and write to bit-cell operations. In contrast, embodiments of the present disclosure provide a digital pixel memory 25 circuit that can be read from and written to simultaneously. Storing data in bit cell 70 can be referred to as "writing" or "inputting" and discovering or determining what data is already stored in bit cell 70 can be referred to as "reading" or "outputting".

An output signal from bit cell 70 can be controlled with an output enable gate that, when not active, is in a high-impedance state (tristate) so that outputs from all of the corresponding bit cells 70 in a row can be connected together and no data output selection is necessary (e.g., no multiplexing is necessary). Each output enable gate can be selected with read enable signal RC (e.g., by a bit-select signal that selects the desired row of bits using a demultiplexer responsive to a read (output) address provided by cluster controller 22) combined with a read enable signal, for example a PWM period signal corresponding to the selected bit, in which case the AND gates of FIG. 7 are unnecessary. (Other selection and read enable methods can be used, for example a serial shift register with an enable token shifted through the register can perform a similar successive selection function.) The read output signal from bit cell 70 has the opposite value of the write input signal, can be sensed to detect the state of bit cell 70 (e.g., with a sense amplifier, if necessary), inverted with an inverter, and used as an input to another circuit, for example constant-current source 30, for example as shown in FIGS. 3, 5, 7, and 8. In some embodiments, the data input signal is inverted rather than the data output signal (shown in FIG. 12).

Pixel memory 25 has a similar input enable gate controlling input to bit cell 70 selected by a write address combined with a write enable signal to form signal WC, for example provided by cluster controller 22. However, as shown in FIG. 10, the input to bit cell 70 (e.g., provided with a data input signal driver) can conflict with the data stored in bit cell 70. This conflict can be resolved, if necessary, with the bit cell 70 schematic diagram of FIG. 11, in which an additional write-select switch (transistor) 78 connected between the pair of first and second inverters 71, 72 on the input side is controlled with an inverted write select signal (NOT WC denoted with a bar over signal WC) that effectively selects between an input controlled with write switch (transistor) 76 and the stored bit value in a bistable bit cell 70. The output is controlled with a read switch (transistor) 74 as in FIG. 9. The input (write) and output (read) selection signals are completely independent; any bit cell 70 can be read from at the same time that any other (including the same bit cell 70) can be written to. Thus, bit cell 70 can be written to and read from independently at the same time without interference, enabling asynchronous input and output to and from bit cells 70 of pixel memory 25 at arbitrary times and rates (subject to transistor switching time). FIG. 12 illustrates an array of four bit cells 70 using the bit cell structure of FIG. 11. Each of the four bit cells 70 corresponds to a bit in a different row of pixels 24 and corresponding pixel values. As with FIG. 10, an entire pixel memory 25 would require N×C×D additional storage locations (where m=4). For pixel memories 25 with M rows of pixels 24 and pixel values, and the number of bit cells 70 and enabling AND gates m equals M. The write and read addresses (or other control circuits) likewise select one of M pixel rows, for example with addresses having M values and $\log_2$ M bits.

In embodiments, both read selection circuits and write selection circuits are independently and separately present in cluster controller 22 (or pixel memory 25 depending on design choices) and are both independently and separately operable at a same time to read and write separate and independent pixel data from and to pixel memory 25. The read-selection circuit and write-selection circuit are not a common shared circuit used for both reading pixel data from pixel memory 25 and writing pixel data to pixel memory 25 at different times. Similarly, the data input and output signals and the wires transmitting the input and output signals are separate and independent signals and wires both operable at a same time to transmit the same or different input and output signals. Likewise, the WC and RC signals are both independently and separately operable at a same time to transmit the same or different write and read signals. Write switch 76 and read switch 74 are separate and independent transistors both operable at a same time to switch responsive to the same or different write control WC and read control RC signals. Thus, according to embodiments of the present disclosure, cluster controller 22 comprises read and write circuits (including wires and circuits comprising, for example, switches and transistors) that are both present in pixel cluster 20 and are separately and independently operable and controlled and do not share circuit elements, except for pixel memory 25 accessed by both the read and write circuits.

Thus, according to embodiments of the present disclosure and as illustrated in FIG. 11, a memory bit cell 70 can comprise a first inverter 71 with a first input and a first output, a second inverter 72 with a second input and a second output, a write switch (transistor) 76 controlled by a write signal WC, and a write-select switch (transistor) 78 controlled by an inverted write signal WC. In some embodiments, the first output is directly connected to the second input, write switch 76 is directly connected between the first input and a data input signal, and write-select switch 78 is directly connected between the second output and the first input. Some embodiments comprise a read switch (transistor) 74 controlled by a read signal RC directly connected between the first output and a data output signal. Read switch 74, write transistor 76, and write-select transistor 78 can be field-effect transistors that connect or disconnect the switched signals. In operation, the write signal is enabled so that the data input signal is applied to the first input, the output of first inverter 71 is applied to the input of second inverter 72, and write-select transistor 78 is off so that first and second inverters 71, 72 are stable. Write switch 76 is turned off so write-select switch 78 is turned on, applying the second output to the first input, so that first and second inverters 71, 72 remain stable with the first output equal to an inverted input signal. At any arbitrary time, read switch 74 can be enabled so that the inverted input is output from bit cell 70.

As illustrated in FIG. 12, pixel memory 25 can comprise an array of bit cells 70 for pixel 24 rows. The data input signals can be directly connected together. A write selection circuit (e.g., a demultiplexer responsive to a write address) in combination with a write enable signal can select a desired bit cell 70 for writing. Similarly, a read selection circuit (e.g., a demultiplexer responsive to a read address) can select a desired bit cell 70 independent of the bit cell 70 enabled for reading. The write-selection circuit is independent of a and a separate circuit from the read-selection circuit. The output of the read transistors 74 can be tri-stated when off (at a high impedance) so all of read transistors 74 outputs can be connected together to provide a memory data output that can be inverted to provide a memory output signal for multiple rows of pixels 24 corresponding to the bit stored in the selected bit cell 70.

In display operation, it is possible that a selected bit is output and then overwritten during the PWM pulse period. If the overwritten bit is the same, there is no change in the originally desired bit output. If the overwritten bit is different, then the output can change state from a bit corresponding to a pixel 24 in an image to a bit corresponding to a pixel 24 in a subsequent image. It is also possible that bits subsequent to an output bit are overwritten so that a combination of the original pixel value and the overwritten value is output. A careful study of the possible pixel values that can be output shows that in a worst case, the displayed pixel values have no greater impact on pixel bit changes (and therefore light emitter luminance) than can be found in the most extreme pixel value changes between successively output image frames. The luminance changes are therefore deemed to be acceptable. For example, if an output bit changes state during its output period, the effective luminance of the bit will be somewhere between the intended luminance of the bit and the overwritten value. Instead of being completely on or off during the pulse period, light emitter 60 will be perceived to be partially on or off during the pulse period and have a perceived luminance between on and off over the pulse period depending on the timing of the bit change. Since the pulse period is only one of a complete PWM pulse train (PWM cycle), the effect is relatively small, or at least no worse than a transition from a pixel value that is completely on to a pixel value that is completely off (or vice versa) in successive image frames. Additionally, such an overwrite error should only persist for a single frame.

In some such embodiments and in general, cluster controller 22 can be operable to (i) read the pixel values in row $I_{OUTPUT}$ of pixel memory 25, ($I_{OUTPUT}$<M), and control pixels 24 in row $I_{OUTPUT}$ to emit light corresponding to the pixel values in row $I_{OUTPUT}$ of pixel memory 25 at the same time that cluster controller 22 can be operable to (ii) store pixel values in rows $I_{INPUT}$ of pixel memory 25 where ($I_{INPUT}$<M). Thus, any row of pixel memory 25 is independent of any other row so that any row can be read from and any row of pixel memory 25 can be written to at the same time.

Pixel memory 25 is shown in FIGS. 4 and 6 as SRAM (static random access memory). However, any digital storage device capable of storing pixel values in bit order of pixel values in sequential rows (e.g., as shown in FIG. 4) or capable of storing entire pixel values in sequential rows (e.g., as shown in FIG. 6) can be used as a pixel memory 25, for example shift registers (parallel or serial or both), flipflops, or latches can be used. Furthermore, addresses are simply mechanisms for accessing pixel values stored in (or to be stored in) pixel memory 25 and any control method that enables the input and output of pixel values into or out of pixel memory 25 can be used, for example clocks that shift data into or out of a register in a desired order. Accessing a pixel value (or a portion of a pixel value) means reading (e.g., outputting) the pixel value (or portion of the pixel value) from pixel memory 25 or writing (e.g., inputting or entering) the pixel value (or portion of the pixel value) into pixel memory 25. Moreover, according to embodiments of the present disclosure, pixel memory 25 can be accessed or controlled with multiple different addresses applied to pixel memory 25 at a same time to enable reading or writing to different rows of pixel memory 25 at the same time. For example, pixel memory 25 can comprise separately accessible registers or arrays of flipflops (latches) and need not be constrained by conventional memory designs (e.g., conventional SRAM designs). Furthermore, the use of sequential addresses or data sequentially stored in a register can be an arbitrary match between pixel value locations in a storage device and the desired input or output, for example by rows. For example, it is not necessary to store sequential rows of pixel values in sequential memory locations, so long as cluster controller 22 can input and output the pixel data in a desired order. For example, in a passive-matrix display, illuminating spatially sequential rows (or columns) of light emitters 60 is an arbitrary choice, often made for convenience or logical or design simplicity, not necessarily out of necessity.

Figure 13:
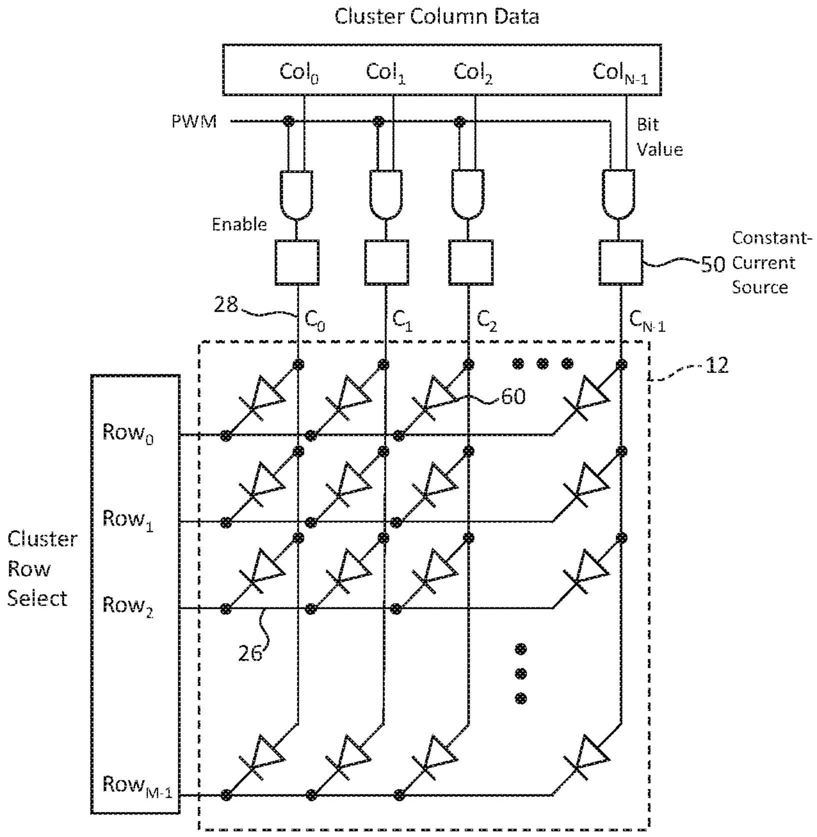
FIG. 13 is a simplified schematic circuit diagram of a portion of an enabling control circuit and light-emitting diodes in a pixel cluster according to illustrative embodiments of the present disclosure.

FIG. 13 illustrates control of an array of light emitters 60 of pixels 24 in a display area 12 of a hybrid display 90. Light emitters 60 are arranged in an array of rows and columns and rows of light emitters 60 are each connected to a cluster row wire 26 and columns of light emitters 60 are each connected to a cluster column wire 28. Cluster row wires 26 can be connected to a cluster row select circuit of cluster controller 22 and cluster column wires 28 can be connected to a cluster column data circuit of cluster controller 22. The cluster row select circuit provides a current sink for a desired row determined by cluster controller 22 and the cluster column data circuit provides bits of data from pixel memory 25 corresponding to the selected pixel 24 row. The provided bits are combined with corresponding PWM pulses to drive constant-current sources 30 that enable the selected rows of light emitters 60 to emit light.

Figure 14:
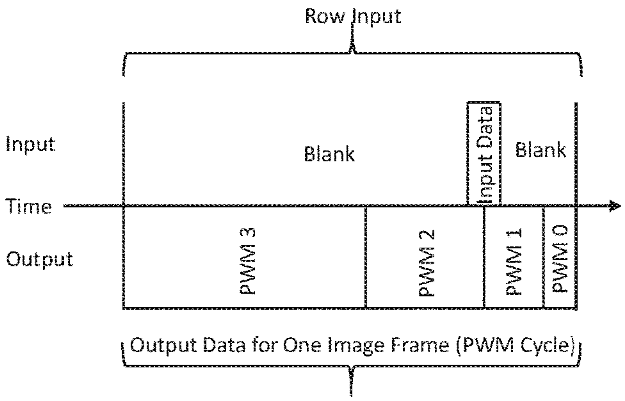
FIGS. 14-15 are timing diagrams showing pixel value input and output for successive image frames according to illustrative embodiments of the present disclosure.

As shown in FIG. 14, if the pixel value input circuits and pixel memory 25 are sufficiently fast compared to the pixel value output (which depends on the display frame rate), pixel values for a row of pixels 24 can be input during a time equal to the shortest pulse (period) of the PWM signal. FIG. 13 illustrates an embodiment in which D=4 so there are four PWM pulses with relative temporal periods of eight, four, two, and one. In the worst case, if pixel values are written during a time of any pulse or temporally adjacent pulses of the PWM cycle, any of the bits corresponding to the pixel value for the pulse or adjacent pulses can change during the PWM cycle, modifying the luminance of the corresponding light emitter 60 during that PWM pulse. In the best case, only the shortest pulse is modified by overwriting the bit corresponding to that period. In any case, as noted above, the modified pulses usually have a relatively small impact on overall luminance during the PWM cycle and in the worst case, is no worse than an extreme case for an unmodified PWM cycle. Thus, in some embodiments, an amount of time to write pixel values into pixel memory 25 can be no greater than (e.g., less than) the time (period) of a shortest pulse of the pulse-width modulation control.

Figure 15:
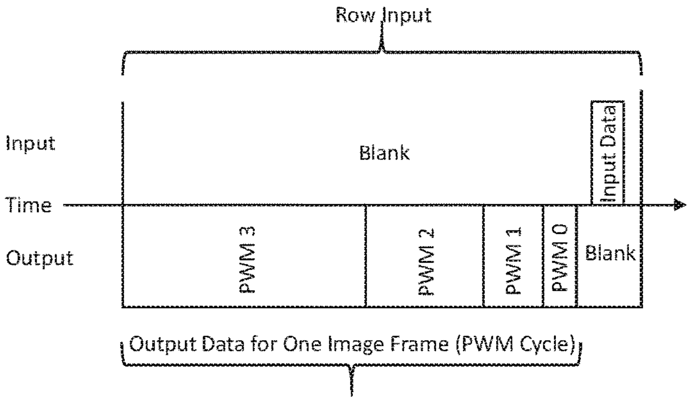

Embodiments illustrated in FIGS. 3, 5, 7-10 provide independent input and output for pixel memory 25. In some embodiments, pixel memory 25 input and output are not completely independent and asynchronous. In some such embodiments, it can be helpful to reduce or minimize any interactions or dependencies on pixel value input (pixel value writing into pixel memory 25) and pixel value output (pixel value reading from pixel memory 25). For example, cluster controller 22 can force pixel value input to occur during the least-significant bit of the PWM cycle (shortest period of the PWM cycle), thus reducing the luminance effect of any bit changes during the PWM cycle. In some embodiments, as shown in FIG. 15, successive PWM cycles are temporally separated by a blanking interval (blank) during which pixel values are input to pixel memory 25. This will reduce the apparent luminance of light emitter 60 somewhat, but if the pixel value writing is very fast, the luminance reduction can be acceptable.

In some embodiments, pixel value input and output conflicts (e.g., modification of pixel values with new image frame pixel values while the pixel values are output) can be avoided by using cluster controller 22 to ensure that an output pixel value is not input at the same time. This can be done by writing new pixel values only into rows of pixel memory 25 that are not output at the same time. In some such embodiments, a pixel value writing time can be no greater than the entire PWM cycle, so that an amount of time to write pixel values into pixel memory 25 is equal to or longer than a shortest pulse of the pulse-width modulation control. Thus, in some such embodiments, cluster controller 22 is operable to (i) read pixel values in row $I_{OUTPUT}$ of pixel memory 25 ($I_{OUTPUT}$<M) and control pixels 24 in row $I_{OUTPUT}$ to emit light corresponding to the pixel values in row $I_{OUTPUT}$ of pixel memory 25 at the same time that cluster controller 22 is operable to (ii) store pixel values in one or more rows $I_{INPUT}$ of pixel memory 25 where ($I_{INPUT} \neq I_{OUTPUT}$) and ($I_{INPUT}$<M). Thus, any row of pixel memory 25 can be read from and any other row of pixel memory 25 can be written to at the same time (or vice versa).

In some embodiments, multiple rows of pixel values can be input during a single output of a row of pixel values. For example, during an output of a row of pixel values (e.g., a PWM cycle), two rows of pixel values can be input so that the one or more rows $I_{INPUT}$ are two or more rows. More generally, any and all of the pixel values in any row of pixel values that are not output at the same time can be input, so that the one or more rows $I_{INPUT}$ are (M−1) rows. Thus, while one row is output (read from), all of the other rows can be input (written to), especially if pixel memory 25 can input data at a greater rate than is necessary for output, for example in a burst mode.

FIG. 5 illustrates embodiments of the present disclosure that copy a row of pixel values into a storage register of pixel memory 25 for the copied row of pixel values (so that pixel memory 25 stores M+1 rows of pixel values). In some embodiments, pixel memory 25 stores M+1 rows of pixel values but does not copy output pixel values. Instead, a row of pixel values is output from pixel memory 25 at a row address at the same time that a row of pixel values is input to a different row address. In some such embodiments, cluster controller 22 is operable to (i) read pixel values in row $I_{OUTPUT}$ of pixel memory 25 ($I_{OUTPUT}$<(M+1)) and control pixels 24 in row $I_{OUTPUT}$ to emit light corresponding to the pixel values in row $I_{OUTPUT}$ of pixel memory 25 at the same time that cluster controller 22 is operable to (ii) store pixel values in rows $I_{INPUT}$ of pixel memory 25 where ($I_{INPUT} \neq I_{OUTPUT}$) and ($I_{INPUT}$<(M+1)). This memory architecture can be implemented, for example by using an output address pointer to indicate pixel memory 25 rows that output pixel values and an input address pointer to indicate pixel memory 25 rows that input pixel values, where the input pointer is not equal to the output pointer and the input and output pointers can be incremented at the end of each PWM cycle, for example as disclosed in U.S. Pat. No. 11,568,803, the disclosure of which is hereby incorporated by reference herein in its entirety. In some such embodiments, no access conflict need occur for reading or writing pixel data in hybrid display 90.

Hybrid display 90 can comprise multiple pixel clusters 20, for example arranged in a regular array as shown in FIG. 1. Each pixel cluster 20 can operate (e.g., input or output pixel values) independently and at the same time so that rows of pixels 24 different pixel clusters 20 emit light at the same time, increasing the possible frame rate by a factor of the number of rows of pixel clusters 20. In some embodiments, a row select enable circuit for each row of a pixel cluster 20 can be common to multiple pixel clusters 20 so that pixel clusters 20 input or output pixel values in a common cluster row at the same time responsive to a common signal.

Figure 16:
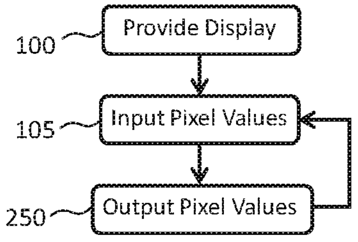
FIGS. 16-19 are flow diagrams illustrating control methods for circuits according to illustrative embodiments of the present disclosure.

As shown in FIG. 16, methods of the present disclosure can comprise providing a hybrid display 90 in step 100 and operating hybrid display 90 by iteratively inputting (receiving) pixel values for example with display controller 14 in step 105 and then outputting the received pixel values in step 250. Pixel values received by display controller 14 can be distributed to pixel clusters 20 and stored in pixel memory 25 by transmitting the pixel values and control signals to pixel clusters 20 through display row wires 17, display column wires 19, or both. Pixel clusters 20 can output the distributed pixel values through cluster row wires 26, cluster column wires 28, or both, to light emitters 60 so that light emitters 60 emit light corresponding to a luminance specified by the corresponding pixel values. Light emitters 60 can be driven with a constant-current signal provided by constant-current source 30 that is either off (so that light emitters 60 do not emit any light) or on at a desired luminance specified by the constant current.

Figure 17:
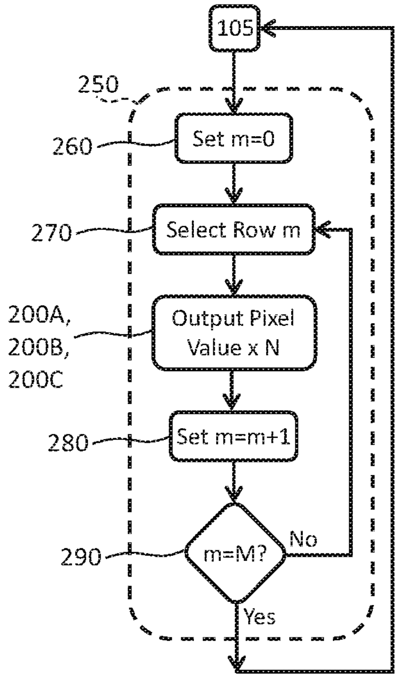

Cluster controller 22 can control pixels 24 with pixel values stored in pixel memory 25 by iteratively outputting rows of pixel values stored in pixel memory 25, as shown in FIG. 17. After cluster controller 22 receives pixel values and stores the pixel values in pixel memory 25, circuitry (e.g., a micro-controller or state machine) can set a counter providing a row address m to zero (or other initial row address) in step 260. Pixel values in row m (e.g., N pixel values, one for each column of pixels 24 comprising C luminance values, one for each of C colors in each column of pixels 24 in pixel cluster 20) are read for output to light emitters 60 having a corresponding address (e.g., row of pixels 24 corresponding to the row of pixel values read from pixel memory 25) in any of steps 200A, 200B, 200C depending on embodiments of the present disclosure. Once the pixel values are output (e.g., displayed by light emitters 60 in pixels 24) counter (row address) m is incremented (or otherwise changed) in step 280 to select the row address of pixel memory 25 storing the luminance values corresponding to next selected row of pixels 24. In step 290, the value of m is compared to M. If the values match, the pixel values have all been displayed and new pixel values input in step 105. If the pixel values do not match, the next row corresponding to incremented row address m is selected in step 270 and the process continues.

Figure 18:
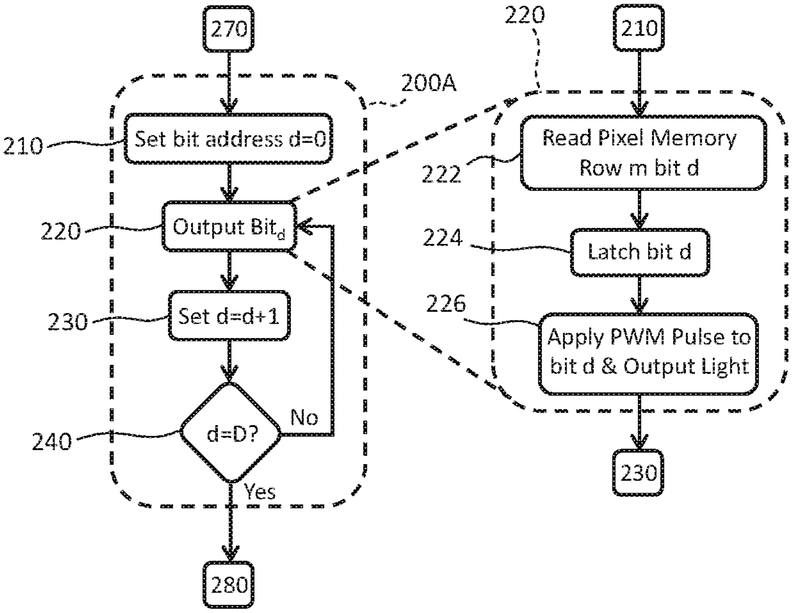

Steps 200A, 200B, and 200C illustrate different embodiments of the present disclosure. As shown in FIG. 18, step 200A shows a method corresponding to the circuit shown in FIG. 3 and the pixel value organization shown in FIG. 4. As noted above, FIG. 4 illustrates pixel data stored with one bit for each luminance value for each column of pixels 24 and light emitters 60 corresponding to each unique row address in pixel memory 25. FIG. 3 illustrates pixel memory 25 comprising (M×N×C×D)+(N×C) bits. In step 210 of FIG. 18 in step 210 of step 200A, the bit address for bit d is set to zero (or other address referencing the bit corresponding to a selected row of pixels 24) and then the bit stored in row address d (e.g., bit d) is output in step 220 (for example by accessing pixel memory 25 addressed by (d+(m×D)) where m is determined in FIG. 16 or by shifting the corresponding bit d from a shift register or accessing the corresponding bit d from some other pixel memory 25 device) in step 222. Output bit d is then stored (e.g., latched or written) in step 224 into a storage device that is a portion of pixel memory 25 and that can be independently accessed from other rows of pixel data in pixel memory 25, to copy bit d. Bit d is then combined with a PWM pulse corresponding to the place of bit d in a luminance value (e.g., as shown with the AND gates of FIG. 3) in step 226 to enable constant-current source 30 to drive light emitters 60 in row m to emit light corresponding to bit d for a period of time corresponding to the PWM pulse. The row address for bit d is then incremented (or otherwise changed) in step 230 and tested in step 240. If d=D (e.g., all of bits d have been displayed, the process can repeat for the next bit. If d is not equal to D, then the next bit d (specified by a pixel memory 25 bit address) is read and displayed in step 220.

Figure 19:
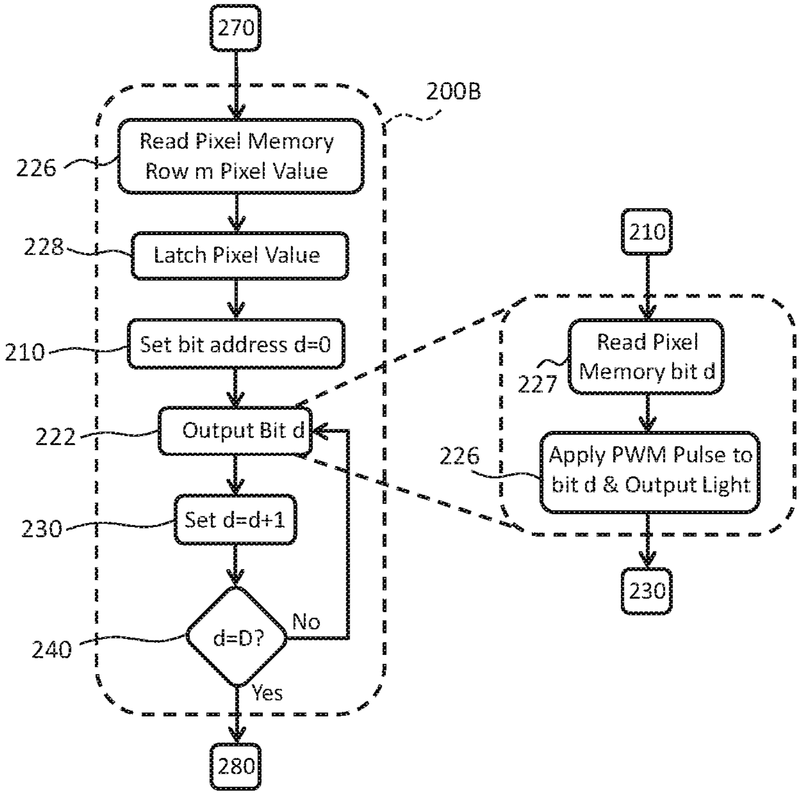

As shown in FIG. 19, step 200B shows a method corresponding to the circuit shown in FIG. 5 and the pixel value organization shown in FIG. 6. As noted above, FIG. 6 illustrates pixel data stored with one luminance value for each column of pixels 24 and light emitters 60 (e.g., a pixel value for each column of pixels 24) corresponding to each unique row address in pixel memory 25. FIG. 5 illustrates pixel memory 25 comprising ((M+1)×N×C×D) bits. (e.g., ((M+1)×N) pixel values. In step 226, a row of pixel values is read and, in step 228 copied into a storage device that is a portion of pixel memory 25 and that can be independently accessed from other rows of pixel values in pixel memory 25, to copy the pixel values. Each bit of each luminance value of the copied pixel values is then successively accessed with, for example, a demultiplexer in step 227 and combined with a PWM pulse corresponding to the place of bit d in the luminance value (e.g., as shown with the AND gates of FIG. 5) in step 226 to enable constant-current source 30 to drive light emitters 60 in row m to emit light corresponding to the bit d accessed by the demultiplexer from the copied pixel data in pixel memory 25 for a period of time corresponding to the PWM pulse in step 229. The demultiplexer address for bit d is then incremented (or otherwise changed to reference a next bit d) in step 230 and tested in step 240. If d=D (e.g., all of bits d have been displayed, the process can repeat for the next bit. If d is not equal to D, then the next bit d (specified by a pixel memory 25 bit address) is read and displayed in step 20.

Figure 20A:
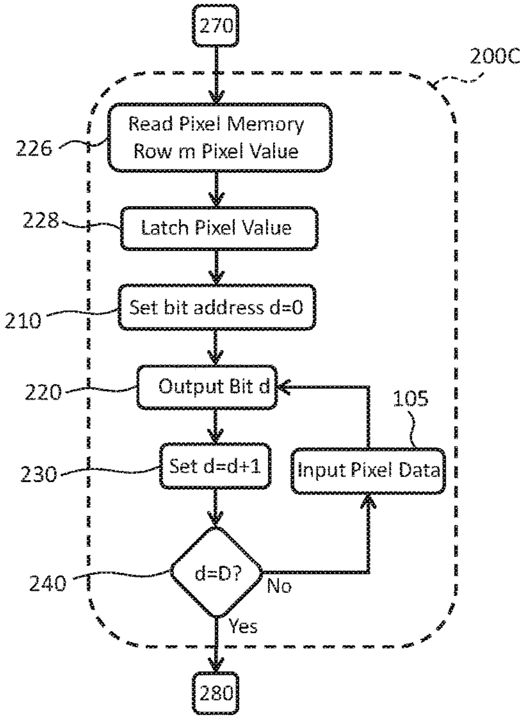
FIG. 20A is a flow diagram illustrating control methods for circuits and FIG. 20B is a corresponding timing diagram according to illustrative embodiments of the present disclosure.
Figure 20B:
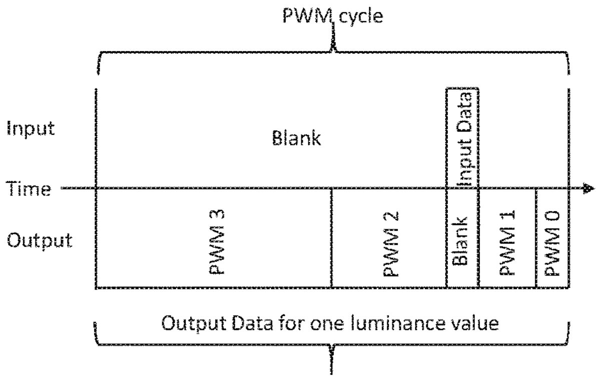
Figure 21A:
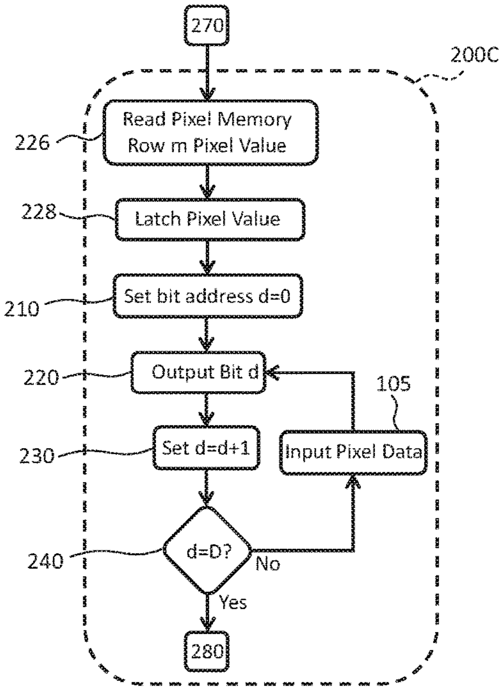
FIG. 21A is a flow diagram illustrating control methods for circuits and FIG. 21B is a corresponding timing diagram according to illustrative embodiments of the present disclosure.
Figure 21B:
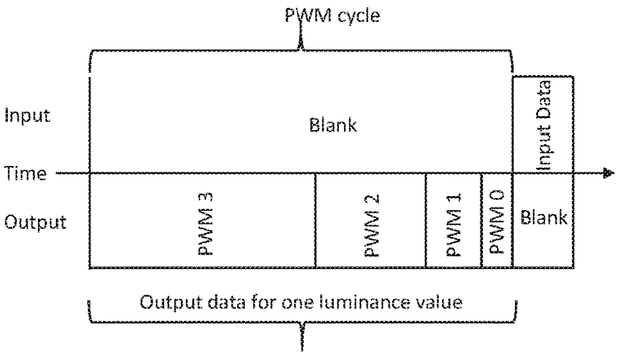

FIGS. 3 and 5 illustrate embodiments that require a pixel memory 25 having storage additional to a single portion of an image frame corresponding to pixel cluster 20. FIGS. 20A through 21B illustrate methods and structures of the present disclosure that do not require additional pixel memory 25 (e.g., as in FIGS. 7 and 8), require only M×N×C×D bits, and do not require simultaneous pixel memory 25 read and write capability as disclosed in FIGS. 10 and 11. In some such embodiments, pixel value input is performed during a blanking interval between pulses of a PWM cycle, e.g., between individual bits of a luminance value (e.g., as shown in FIGS. 20A and 20B) or during a blanking interval between PWM pixel value output cycles (e.g., as shown in FIGS. 21A and 21B). Thus, cluster controller 22 can be operable to input a pixel value into pixel memory 25 in a blanking interval after controlling pixels 24 to emit light corresponding to a bit of a luminance value or in a blanking interval after controlling pixels 24 to emit light corresponding to an entire pixel value.

FIG. 20A is a flow diagram illustrating pixel data input during a blanking interval between successive bit d outputs. The pixel data input can be a single bit for each column of light emitters 60 (as in FIG. 4) or can be entire luminance values for each column of light emitters 60, e.g., an entire pixel value, as in FIG. 6. The pixel data input can be for the same row m of pixels 24 as are being output or can be for a different row of pixel values. As shown in FIG. 20B, the input can be done during an output blanking interval (e.g., a period in which no output is enabled) between two successive bit outputs. In some embodiments, a blanking interval for pixel data input can be provided (e.g., under the control of cluster controller 22) after every bit d output or between fewer than every bit d output, for example after just one bit d output for a PWM cycle. (FIG. 20B illustrates a single blanking interval for pixel data input. FIG. 20A implies that pixel data input occurs in a blanking interval after every bit d output.)

FIG. 21A is a flow diagram illustrating pixel data input during a blanking interval between successive PWM cycles (e.g., after an entire luminance value of D bits has been output). The pixel data input can be a single bit for each column of light emitters 60 (as in FIG. 4) or can be entire luminance values for each column of light emitters 60, e.g., an entire pixel value, as in FIG. 6. The pixel data input can be for the same row m of pixels 24 as are being output or can be for a different row of pixel values. As shown in FIG. 21B, the input can be done during an output blanking interval (e.g., a period during which no output is enabled) between two successive PWM cycles. In some embodiments, a blanking interval for pixel data input can be provided (e.g., under the control of cluster controller 22) after every PWM cycle and luminance value output or between fewer than all PWM cycles, for example after one row of pixel values are output.

Figure 22:
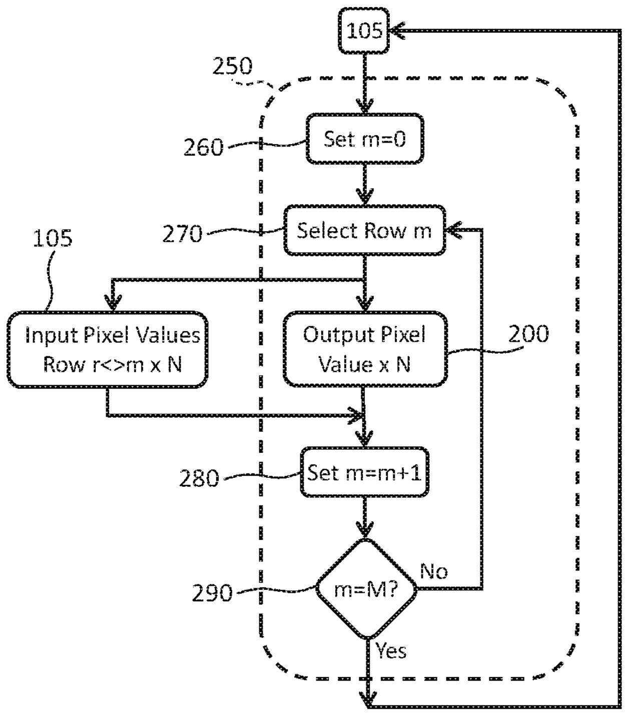
FIG. 22 is a flow diagram illustrating control methods for circuits according to illustrative embodiments of the present disclosure.

FIG. 22 is a flow diagram illustrating embodiments in which different rows of pixel values in pixel memory 25 are independently accessible (e.g., each pixel 24 row specified by a unique pixel memory 25 address or control can be read from or written to independently from pixel values in every other pixel 24 row) but in which pixel values in a given row cannot be read from and written to simultaneously (unlike the embodiments illustrated in FIGS. 10-12. In such embodiments, pixel values in a row m (a row having an address m) can be read from and output in step 200 at the same that a row r having an address value r≠m.

Cluster controllers 22 can be thin-film circuits. According to some embodiments of the present disclosure, cluster controllers 22 comprise integrated circuits formed in a crystalline semiconductor (e.g., silicon) substrate that are transferred from a native source wafer to non-native display substrate 10 or to a non-native cluster substrate, for example by micro-transfer printing. As a consequence of micro-transfer printing, cluster controller 22 can comprise a fractured or separated controller tether. Such crystalline circuits have much better performance and a smaller size than thin-film semiconductor circuits. The smaller size of cluster controller 22 provides additional area over display substrate 10 for larger display column wires 19, display row wires 17, pixels 24, or other circuits, enabling embodiments of the present disclosure.

According to some embodiments of the present disclosure, display row controller 16 can provide timing signals to each pixel cluster 20 in a row of pixel clusters 20 or to rows of pixels 24 at a same time, for example row-select signals or pixel timing signals such as pulse-width modulation (PWM) signals. According to some embodiments, each pixel cluster 20 can comprise a pixel timing circuit that internally and independently generates a timing signal controlling the brightness of pixels 24, for example in combination with digital data values stored in pixel memory 25. In some such embodiments, internally generated timing signals need not be provided by display row controller 16 or display column controller 18, e.g., simplifying display row controller 16, and reducing the bandwidth and frequency requirements for row-select signals on display row wires 17 or column-data signals on display column wires 19, as certain operations can instead be carried out locally in cluster controllers 22.

Embodiments illustrated in FIG. 1 comprise a display row controller 16. According to some embodiments of the present disclosure, hybrid display 90 does not comprise a display row controller 16. Functions performed by display row controller 16 can be performed by display column controller 18 that is appropriately electrically connected to pixel clusters 20 and by circuits internal to each pixel cluster 20, e.g., incorporated into cluster controller 22, for example including token-passing daisy-chained serially connected circuits, or packet addressing, transmission, and reception circuits. Some such embodiments reduce the amount of circuitry and wires needed to control hybrid display 90. Thus, embodiments of the present disclosure are useful for hybrid displays 90 having fewer integrated circuits, fewer wires, and fewer metal layers constructed at reduced expense.

In a method according to some embodiments of the present disclosure, integrated circuits are disposed on display substrate 10 by micro transfer printing. In some methods, integrated circuits (or portions thereof) or LEDs are disposed on a cluster substrate to form a heterogeneous pixel 24 or pixel cluster 20 and pixel cluster 20 on the cluster substrate is disposed on display substrate 10 using compound micro-assembly structures and methods, for example as described in U.S. patent application Ser. No. 14/822,868 filed Aug. 10, 2015, entitled Compound Micro-Assembly Strategies and Devices. However, since pixel clusters 20 can be larger than the integrated circuits included therein, in some methods of the present disclosure, pixel clusters 20 are disposed on display substrate 10 using pick-and-place methods found in the printed-circuit board industry, for example using vacuum grippers. Circuits and light-emitters 60 in a pixel cluster 20 can be interconnected on display substrate 10 using photolithographic methods and materials or printed circuit board methods and materials. Circuits and light emitters 60 in a pixel cluster 20 can be interconnected on a cluster substrate using photolithographic methods and materials. Pixel clusters 20 can be interconnected on display substrate 10 using photolithographic methods and materials or printed circuit board methods and materials.

In certain embodiments, display substrate 10 includes material, for example glass or plastic, different from a material in an integrated-circuit substrate, for example a semiconductor material such as silicon or GaN. Light emitters 60 can be formed separately on separate semiconductor substrates, assembled onto cluster substrates (e.g., semiconductor substrates on or in which native cluster controllers 22 can be constructed to form pixel clusters 20 and then the assembled units are located on the surface of the display substrate 10. This arrangement has the advantage that the integrated circuits or pixel clusters 20 can be separately tested on a cluster substrate and the cluster modules accepted, repaired, or discarded before pixel clusters 20 are located on display substrate 10, thus improving yields and reducing costs.

In some embodiments of the present disclosure, providing hybrid display 90, display substrate 10, or pixel clusters 20 can include forming conductive wires (e.g., display row wires 17 and display column wires 19) on display substrate 10 or a cluster substrate by using photolithographic and display substrate 10 processing techniques, for example photolithographic processes employing metal or metal oxide deposition using evaporation or sputtering, curable resin coatings (e.g. SU8), positive or negative photoresist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with the cluster substrates. Alternatively, wires can include one or more crude lithography interconnections having a width from 2 μm to 2 mm, wherein each crude lithography interconnection electrically interconnects pixels 24 on display substrate 10. For example, electrical interconnections can be formed with fine interconnections (e.g., relatively small high-resolution interconnections) while display column wires 19 and/or display row wires 17 are formed with crude interconnections (e.g., relatively large low-resolution interconnections).

In some embodiments, red, green, and blue LEDs (e.g., micro-LEDs) or integrated circuits forming cluster controllers 22 are micro-transfer printed to cluster substrates or display substrate 10 in one or more transfers and can comprise fractured or separated tethers as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 60 are then interconnected, for example with conductive wires and optionally including connection pads and other electrical connection structures, to enable a controller (e.g., cluster controller 22) to electrically interact with light emitters 60 to emit, or otherwise control, light.

According to various embodiments, flat-panel hybrid display 90 can include a variety of designs having a variety of resolutions, light emitter 60 sizes, and hybrid displays 90 having a range of display substrate 10 areas. Light emitters 60 of hybrid display 90 can be arranged in a regular array or an irregular array on or over display substrate 10.

In some embodiments, LEDs are formed in substrates or on supports separate from display substrate 10. For example, LEDs or cluster controller 22 are separately formed in a semiconductor wafer. LEDS or cluster controllers 22 are then removed from the wafer and transferred, for example using micro-transfer printing, to display substrate 10 or a cluster substrate. Such arrangements have the advantage of using a crystalline semiconductor substrate that provides higher-performance integrated circuit components than can be made in the amorphous or polysilicon semiconductor available in thin-film circuits on a large substrate such as display substrate 10. Such micro-transferred LEDs or cluster controllers 22 can comprise a fractured or separated tether as a consequence of a micro-transfer printing process.

By employing a multi-step transfer or assembly process, increased yields are achieved and thus reduced costs for flat-panel hybrid displays 90 of the present disclosure. Additional details useful in understanding and performing aspects of the present disclosure are described in U.S. patent application Ser. No. 14/743,981, filed Jun. 18, 2015, entitled Micro Assembled Micro LED Displays and Lighting Elements, the disclosure of which is hereby incorporated by reference herein in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

10 display substrate
12 display area
14 display controller
15 pixel-value receiver

16 display row controller
17 display row wire
18 display column controller
19 display column wire
20 cluster/pixel cluster
22 cluster controller
24 pixel
25 pixel memory
26 cluster row wire
28 cluster column wire
30 constant-current source
60 light emitter
70 bistable bit cell
71 first inverter
72 second inverter
74 read transistor/read switch
76 write transistor/write switch
78 write-select transistor/write-select switch
90 hybrid display
100 provide display step
105 input pixel values step
200A output pixel value×N step
200B output pixel value×N step
200C output pixel value×N step
210 set d=0 step
220 output bit d step
222 read pixel memory row m bit d step
224 latch bit d step
226 apply PWM pulse and output light step
227 read pixel memory bit d step
228 latch pixel value step
230 set d=d+1 step
240 test d=D? step
250 output pixel values step
260 set m=0 step
270 select row m step
280 set m=m+1 step
290 test m=M? step

What is claimed:

1. A hybrid display, comprising:

pixel clusters, each of the pixel clusters comprising (i) pixels; (ii) a pixel memory for storing pixel values for each of the pixels; and (iii) a cluster controller operable to (a) control the pixels to emit light corresponding to the pixel values, (b) receive the pixel values, and (c) store the pixel values in the pixel memory; and a display controller operable to provide the pixel values to the cluster controller for each of the pixel clusters, wherein, for each of the pixel clusters, the cluster controller is operable to store one or more of the pixel values in the pixel memory at a same time that the cluster controller controls the pixels to emit light using one or more of the pixel values, and wherein the cluster controller is operable to (i) receive an input address of one or more input pixel values, (ii) compare the input address to an output address of a row, the output address being of one or more output pixel values that are used to control the pixels to emit light, and (iii) write the one or more input pixel values into the pixel memory only if the input address does not match the output address.

2. The hybrid display of claim 1, wherein, for each of the pixel clusters, the cluster controller controls the pixels to emit light using pulse-width modulation control.

3. The hybrid display of claim 2, wherein an amount of time to write a pixel value into the pixel memory is no greater than an amount of time of a shortest pulse of the pulse-width modulation control.

4. The hybrid display of claim 2, wherein an amount of time to write a pixel value into the pixel memory is equal to or greater than an amount of time of a shortest pulse of the pulse-width modulation control.

5. The hybrid display of claim 1, wherein, for each of the pixel clusters:

each of the pixels comprises C light emitters;

each of the pixel values comprises C luminance values, each corresponding to one of the C light emitters;

each of the luminance values has D bits;

the pixels are disposed in an array of M rows and N columns;

M is no less than two, N is no less than one, and C is no less than one; and the pixel memory has (i) a storage for pixel values of at least M×N×C×D bits and (ii) at least M row addresses.

6. The hybrid display of claim 5, wherein pixel data stored at any row address of the pixel memory can be accessed independently of pixel data stored at any other row address of the pixel memory so that pixel data can be read at any row address of the pixel memory at a same time that pixel data can be written to any row address of the pixel memory.

7. The hybrid display of claim 5, wherein the cluster controller is operable to read output pixel data stored at row address $I_{OUTPUT}$ of the pixel memory and control each of the pixels corresponding to row address $I_{OUTPUT}$ to emit light corresponding to the output pixel data at a same time that the cluster controller stores input pixel data at row address $I_{INPUT}$ of the pixel memory.

8. The hybrid display of claim 7, wherein $I_{OUTPUT}$ does not equal $I_{INPUT}$.

9. The hybrid display of claim 5, wherein the cluster controller is operable to read output pixel data stored at row address $I_{OUTPUT}$ of the pixel memory and control each of the pixels corresponding to row address $I_{OUTPUT}$ to emit light corresponding to the output pixel data at a same time that the cluster controller stores input pixel data in one or more row addresses $I_{INPUT}$ of the pixel memory where $I_{INPUT} \neq I_{OUTPUT}$.

10. The hybrid display of claim 5, wherein the cluster controller is operable to read output pixel data stored at row address $I_{OUTPUT}$ of the pixel memory and copy the pixel data into the pixel memory at row address $I_{OUTPUT2}$, where $I_{OUTPUT} \neq I_{OUTPUT2}$.

11. The hybrid display of claim 10, wherein the cluster controller is operable to copy the pixel data bit wise.

12. The hybrid display of claim 10, wherein the cluster controller is operable to copy the pixel data pixel value wise.

13. The hybrid display of claim 1, wherein, for each of the pixel clusters, the cluster controller is operable to receive rows of pixel values at an input rate and output rows of pixel values to display information at an output rate and the input rate is greater than the output rate.

14. The hybrid display of claim 1, wherein, for each of the pixel clusters, the cluster controller is operable to receive rows of pixel values at an input rate and output rows of pixel values to display information at an output rate and the input rate is less than or equal to the output rate.

15. The hybrid display of claim 1, wherein, for each of the pixel clusters, the cluster controller is operable to sequentially output single bits of each pixel value in a row of pixel values from the pixel memory and control the pixels to emit light corresponding to the single bits.

16. The hybrid display of claim 1, wherein the cluster controller is operable to receive pixel values in a burst at regular or irregular intervals.

17. The hybrid display of claim 1, wherein, for each of the pixel clusters, the cluster controller is operable to control the pixels independently of any other of the pixel clusters.

18. A hybrid display, comprising:

pixel clusters, each of the pixel clusters comprising (i) pixels; (ii) a pixel memory for storing pixel values for each of the pixels; and (iii) a cluster controller operable to (a) control the pixels to emit light corresponding to the pixel values, (b) receive the pixel values, and (c) store the pixel values in the pixel memory; and a display controller operable to provide the pixel values to the cluster controller for each of the pixel clusters, wherein, for each of the pixel clusters, the cluster controller is operable to store one or more of the pixel values in the pixel memory at a same time that the cluster controller controls the pixels to emit light using one or more of the pixel values, wherein, for each of the pixel clusters:

each of the pixels comprises C light emitters;

each of the pixel values comprises C luminance values, each corresponding to one of the C light emitters;

each of the luminance values has D bits;

the pixels are disposed in an array of M rows and N columns;

M is no less than two, N is no less than one, and C is no less than one; and the pixel memory has (i) a storage for pixel values of at least M×N×C×D bits and (ii) at least M row addresses, and wherein:

the pixel memory storage is (M+1)×N×C×D bits in size and the pixel memory has row addresses having a range at least from zero to M, and the cluster controller is operable to read output pixel data stored at row address $I_{OUTPUT}$ of the pixel memory ($I_{OUTPUT}$<(M+1)) and control the pixels corresponding to row address $I_{OUTPUT}$ to emit light corresponding to the output pixel data at a same time that the cluster controller stores input pixel data at one or more row addresses $I_{INPUT}$ of the pixel memory, where $I_{INPUT} \neq I_{OUTPUT}$ and $I_{INPUT}$<(M+1).

19. A hybrid display, comprising:

pixel clusters, each of the pixel clusters comprising (i) pixels; (ii) a pixel memory for storing digital pixel values for each of the pixels; and (iii) a cluster controller operable to (a) control the pixels to emit light corresponding to the digital pixel values, (b) receive the digital pixel values, and (c) store the digital pixel values in the pixel memory; and a display controller operable to provide the digital pixel values to the cluster controller for each of the pixel clusters, wherein, for each of the pixel clusters, the cluster controller is operable to store one or more of the digital pixel values in the pixel memory at a same time that the cluster controller controls the pixels to emit light using one or more of the digital pixel values, wherein, for each of the pixel clusters:

each of the pixels comprises C light emitters;

each of the pixel values comprises C luminance values, each corresponding to one of the C light emitters;

each of the luminance values has D bits;

the pixels are disposed in an array of M rows and N columns;

M is no less than two, N is no less than one, and C is no less than one; and the pixel memory has (i) a storage for digital pixel values of at least M×N×C×D bits and (ii) at least M row addresses, wherein the cluster controller is operable to read output pixel data stored at row address $I_{OUTPUT}$ of the pixel memory and control each of the pixels corresponding to row address $I_{OUTPUT}$ to emit light corresponding to the output pixel data at a same time that the cluster controller stores input pixel data at row address $I_{INPUT}$ of the pixel memory, and wherein $I_{OUTPUT}$ equals $I_{INPUT}$.

* * * * *